(12) United States Patent
Price et al.

(10) Patent No.: US 10,395,221 B1
(45) Date of Patent: *Aug. 27, 2019

(54) PROVIDING REWARDS TO ENCOURAGE DEVICE CARE

(71) Applicant: Amazon Technologies, Inc., Reno, NV (US)

(72) Inventors: Kenneth James Price, Seattle, WA (US); Heather Dystrup-Chiang, Seattle, WA (US); Shannon Quek, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1009 days.

This patent is subject to a terminal disclaimer.

(21) Appl. No.: 14/316,362

(22) Filed: Jun. 26, 2014

(51) Int. Cl.
*G06Q 10/00* (2012.01)
*G06Q 30/00* (2012.01)

(52) U.S. Cl.
CPC ........... *G06Q 10/20* (2013.01); *G06Q 30/016* (2013.01)

(58) Field of Classification Search
CPC .................................................... G06Q 10/20
See application file for complete search history.

(56) References Cited

U.S. PATENT DOCUMENTS

| | | | | |
|---|---|---|---|---|
| 6,169,930 B1* | 1/2001 | Blachek | G06F 1/206 | 360/75 |
| 6,954,858 B1* | 10/2005 | Welborn | G06F 21/577 | 726/24 |
| 8,044,818 B2* | 10/2011 | Tysowski | G08B 21/24 | 340/540 |
| 8,255,006 B1* | 8/2012 | Chavez | H04M 1/72569 | 379/207.09 |
| 8,281,403 B1* | 10/2012 | Asheghian | G06F 11/008 | 705/400 |
| 8,374,888 B2* | 2/2013 | Earles | G06Q 30/02 | 705/2 |
| 8,533,842 B1* | 9/2013 | Satish | H04L 63/20 | 726/22 |
| 8,805,709 B2* | 8/2014 | Grosso | G06Q 40/08 | 705/4 |
| 9,148,762 B2* | 9/2015 | Taylor | H04W 4/027 | |

(Continued)

OTHER PUBLICATIONS

Moco et al., "Mobile Forensics: A Smartphone-Based Activity Logger," 2014, 2014 21st International Conference on Telecommunications, IEEE, all pages. (Year: 2014).*

*Primary Examiner* — Jacob C. Coppola
(74) *Attorney, Agent, or Firm* — Lee & Hayes, P.C.

(57) ABSTRACT

In some examples, a portable electronic device may monitor a plurality of device care metrics to detect and characterize a level of care provided to an electronic device by a user. Further, the user may receive a reward for providing a level of care as specified by one or more device care thresholds. For example, the device may monitor sensor information from one or more sensors for determining whether the device has experienced a physical event, such as a fall event, an excessive moisture event, or the like. Further, the device may also monitor for system events, such as whether to update a program, whether malicious code has been installed, or the like. The occurrence of a physical event and/or the user's actions in response to a system event may determine a user's eligibility to receive a reward based on the level of device care provided.

20 Claims, 11 Drawing Sheets

(56) References Cited

U.S. PATENT DOCUMENTS

| | | | |
|---|---|---|---|
| 9,689,887 B1* | 6/2017 | Srinivas | G01B 21/18 |
| 2004/0153362 A1* | 8/2004 | Bauer | G06Q 40/02 |
| | | | 705/4 |
| 2005/0022028 A1* | 1/2005 | Hall | G07F 17/0014 |
| | | | 726/4 |
| 2005/0164633 A1* | 7/2005 | Linjama | H04B 1/1615 |
| | | | 455/41.2 |
| 2007/0030159 A1* | 2/2007 | Stoev | G01P 15/0891 |
| | | | 340/669 |
| 2007/0100595 A1* | 5/2007 | Earles | G06Q 30/02 |
| | | | 703/13 |
| 2007/0223123 A1* | 9/2007 | Karakas | G01P 15/0891 |
| | | | 360/31 |
| 2008/0065427 A1* | 3/2008 | Helitzer | G06Q 40/08 |
| | | | 705/4 |
| 2009/0187370 A1* | 7/2009 | Pasolini | G01P 1/006 |
| | | | 702/141 |
| 2009/0249497 A1* | 10/2009 | Fitzgerald | H04W 12/12 |
| | | | 726/35 |
| 2009/0283559 A1* | 11/2009 | Foggiato | A45F 5/00 |
| | | | 224/217 |
| 2010/0062833 A1* | 3/2010 | Mattice | G11B 19/042 |
| | | | 463/24 |
| 2011/0075940 A1* | 3/2011 | Deaver | G06F 21/552 |
| | | | 382/229 |
| 2011/0080349 A1* | 4/2011 | Holbein | G06F 1/3203 |
| | | | 345/173 |
| 2011/0202305 A1* | 8/2011 | Willis | G01C 21/16 |
| | | | 702/141 |
| 2011/0264246 A1* | 10/2011 | Pantoja | G06Q 30/02 |
| | | | 700/92 |
| 2012/0029947 A1* | 2/2012 | Wooldridge | G06Q 40/08 |
| | | | 705/4 |
| 2012/0035990 A1* | 2/2012 | Lewis | G06Q 30/0207 |
| | | | 705/14.1 |
| 2012/0072241 A1* | 3/2012 | Krause | G06Q 40/08 |
| | | | 705/4 |
| 2012/0231429 A1* | 9/2012 | Hadatsuki | G06Q 10/103 |
| | | | 434/236 |
| 2013/0054180 A1* | 2/2013 | Barfield | G01P 15/0891 |
| | | | 702/138 |
| 2013/0076530 A1* | 3/2013 | Heckel, III | G08C 19/00 |
| | | | 340/870.02 |
| 2013/0103429 A1* | 4/2013 | Buitrago | G06Q 40/08 |
| | | | 705/4 |
| 2013/0138715 A1* | 5/2013 | Petersen | H04M 1/24 |
| | | | 709/203 |
| 2013/0340089 A1* | 12/2013 | Steinberg | H04L 63/10 |
| | | | 726/27 |
| 2014/0129175 A1* | 5/2014 | Poduri | H04W 4/029 |
| | | | 702/141 |
| 2014/0191873 A1* | 7/2014 | Kreiner | H04M 1/72569 |
| | | | 340/604 |
| 2014/0200929 A1* | 7/2014 | Fitzgerald | G06F 21/88 |
| | | | 705/4 |
| 2014/0342717 A1* | 11/2014 | Chen | H04W 4/046 |
| | | | 455/418 |
| 2014/0342725 A1* | 11/2014 | Taylor | H04W 4/027 |
| | | | 455/419 |
| 2014/0349615 A1* | 11/2014 | Hsu | H04L 63/20 |
| | | | 455/411 |
| 2015/0016001 A1* | 1/2015 | Quirk | H02H 11/00 |
| | | | 361/78 |
| 2015/0097690 A1* | 4/2015 | Ady | G08B 21/182 |
| | | | 340/665 |

* cited by examiner

US 10,395,221 B1

PROVIDING REWARDS TO ENCOURAGE DEVICE CARE

BACKGROUND

People use handheld, mobile or other portable electronic devices for a variety of purposes, such as making telephone calls, texting, accessing the Internet, sending and receiving email, consuming digital content, executing applications, playing games, navigation, and numerous other functions. Users of these devices may occasionally fail to exercise proper care for their devices, thus shortening the lifespan of the devices. For example, users of these devices may sometimes drop their devices or install malicious software applications. Further, unsatisfactory care of these devices may be prevalent in situations in which the devices are utilized by a child. Additionally, because these devices are typically covered by warranty, users may not always have sufficient incentive to take proper care of their devices.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
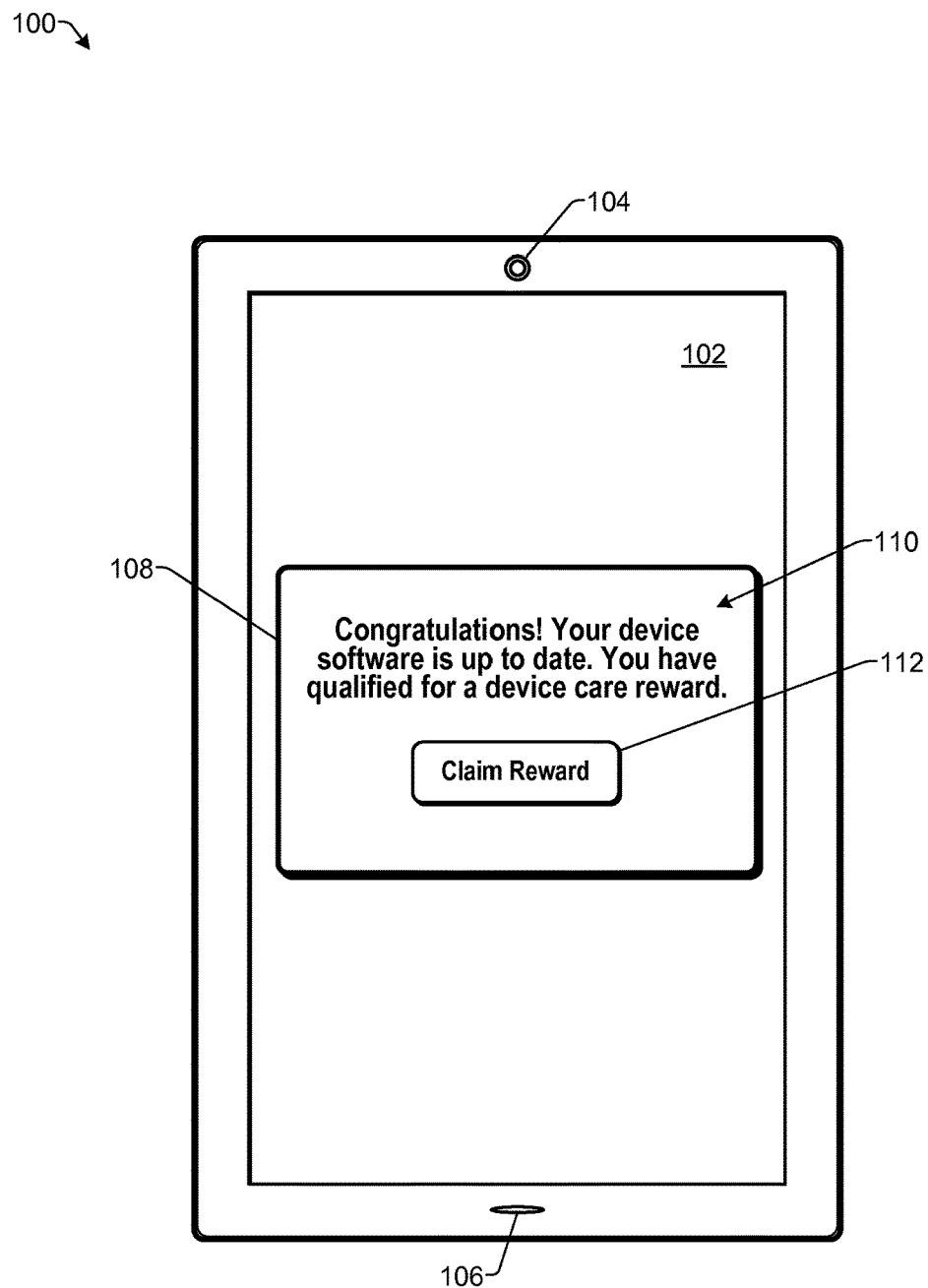
FIG. 1 illustrates an example user interface for receiving a reward for device care according to some implementations.

This disclosure describes techniques and arrangements for providing rewards to encourage a user to take care of an electronic device. This disclosure further includes techniques and arrangements for determining whether a user is taking sufficient care of the electronic device to qualify for a reward. Examples of device care that may be performed by a user may include minimizing drop events or projectile motion events, such as when a device is dropped or thrown, minimizing exposure to excessive levels of moisture, such as submersion in water, maintaining the integrity of an operating system and/or applications installed on the electronic device, updating the operating system and/or applications installed on the electronic device, preserving the lifespan of a battery of the electronic device, and/or using the device in accordance with at least one of parental control settings and/or a security policy. In some implementations, the reward may include at least one of stored credit, badges, offers, discounts, coupons and/or any other type of good or service the user may be interested in consuming (which the system may have determined the user is interested in consuming), using the electronic device, or in association with a user account with which the electronic device is associated. In other implementations, the rewards might comprise goods, services or other value that can be used or consumed apart from the electronic device, such as new hardware, upgraded hardware, (enhanced) loyalty program membership, accessory device(s), discounted/free content (e.g., books, magazine subscriptions, movies, music, etc.), tickets for live performances, travel vouchers, etc.

In some examples, sensor data from built-in or onboard sensors, such as from one or more accelerometers, gyroscopes or other sensors incorporated into the electronic device may provide acceleration and orientation information before, during and following a fall of the electronic device. For instance, the sensors may be used to determine when the electronic device is in freefall and the occurrence of other nonstandard motion or acceleration conditions indicating that the device is falling. The collected sensor information may be used to determine whether the electronic device experienced a fall event, the duration of the fall event, the height of the fall event and/or an orientation of the electronic device during the fall event, such as at a time of impact with a surface. The fall event information may be stored on the portable electronic device as care information and/or sent to another computing device.

In some implementations, sensor data from built-in or onboard sensors, such as from one or more submersion sensors or other moisture sensors incorporated into the electronic device, may provide moisture information, such as to indicate an exposure to liquid. For instance, the moisture sensor(s) may be used to determine that the electronic device has been exposed to excessive levels of moisture and/or submerged in a liquid body. The collected sensor information may be used to determine whether the electronic device is experiencing or experienced an excessive moisture event, the duration of the excessive moisture event, an orientation of the electronic device during the excessive moisture event, and so forth. The excessive moisture event information may be stored on the portable electronic device as care information and/or sent to another computing device.

In some instances, state information associated with an operating system of the portable electronic device may be collected. The operating system state information may be used to determine whether the integrity of the operating system has been compromised, e.g., in an attempt to jailbreak or root the electronic device or otherwise attempt to override certain operating system features. Further, the state information may be used to determine whether the most recent version of the operating system has been installed on the electronic device. The operating system state information may be stored on the portable electronic device as care information and/or sent to another computing device.

In some examples, state information associated with one or more applications installed on the device may be collected. The application state information may be used to determine whether the integrity of any of the one or more applications has been compromised in an attempt to obtain unauthorized execution of an application or unauthorized access to application data. Further, the state information may be used to determine whether the most recent version of one or more of the installed applications is present on the electronic device. The application state information may be stored on the portable electronic device as care information and/or sent to another computing device.

Additionally, in some cases, security information generated in response to device activity may be collected and monitored, such as by a security module that executes on the portable electronic device. The security information may be used to identify unauthorized activity by a user of the electronic device, and/or potentially malicious activity by the user or the one or more applications installed on the electronic device. Further, the security module may prevent unauthorized activity and/or perform remediation techniques in response to the detection of malware. The security information may be stored on the portable electronic device as care information and/or sent to another computing device.

In addition, in some examples, state information associated with one or more hardware components of the device may be collected. For instance, the device state information may be used to determine the health of a battery of the electronic device and battery charging patterns of a user of the electronic device. The device state information may be stored on the portable electronic device as care information and/or sent to another computing device.

In some implementations, the electronic device may analyze at least one of the physical care information, such as information related to a fall event or an excessive moisture event, operating system state information, application state information, security information, and device state information to determine whether a user of the device should receive a reward for the user's care of the device. For instance, the device may compare the operating system state information to stored settings associated with device care and determine that a user has provided sufficient device care to satisfy at least one requirement or other threshold for receiving a reward.

As used herein, device care that is sufficient to receive a reward may include device care that meets one or more minimum threshold requirements for one or more respective monitored device care metrics. Examples of device care metrics that may be monitored include physical care metrics, such as fall event information and moisture event information, and system care metrics, such as operating system state information, application state information, security information and/or device state information. Each of these device care metrics may have threshold established for the user to obtain a reward for device care. For example, with respect to the fall event metric, the threshold might be that no falls over a certain height have occurred in the past month, or other specified time period. Similarly, for the moisture event metric, a threshold may be that no submersion events or other excessive moisture events have occurred over the time period. Further, with respect to the system event metrics, such as an operating system event metric, an application event metric, etc., a threshold may be that the user complies with a message to perform an action, such as updating a program, removing an application, charging a battery and so forth within a specified amount of time or before receiving a specified number of messages, or the like. Additionally, in some cases, only one or several of these device care metrics might be monitored to determine whether the level of device care is sufficient to receive a reward.

Further, the electronic device may provide care information to a remote computing device, such as over a network. For example, if operational, the electronic device may transmit the stored physical care information to the remote computing device immediately after a fall or moisture event occurs, on a periodic basis, or after a threshold number of fall or moisture events have occurred. As another example, the physical care information may be sent by the electronic device when the electronic device contacts a service provider, such as during synchronization of other content or information on the electronic device with the service provider. The physical care information received by the computing device may be used to remotely determine whether a user has provided sufficient device care for the device to meet the at least one threshold, and provide a reward, generate a message to the user, or the like.

In some implementations, a remote computing device may provide information to the electronic device that may assist the electronic device in determining whether a user has provided sufficient device care to the electronic device. For instance, the remote computing device may provide the electronic device with information associated with the most recent version of an operating system of the electronic device. The electronic device may compare the information associated with most recent version of the operating system with the operating system state information, and determine whether a user of the electronic device has installed the most recent version of the operating system on the electronic device.

In some implementations, a remote computing device associated with a service provider may provide a reward in response to a determination by the electronic device or the remote computing device that a user has provided device care for the electronic device. For instance, the remote computing device may determine that the user has provided device care for the electronic device over a specific period of time, and provide, e.g., to a user account associated with the electronic device, purchase credits that can be used towards acquiring goods or services. Further, the electronic device or remote computing device may determine that the user has provided device care for the electronic device up until a specified device ownership milestone or device possession milestone. For instance, the electronic device 100 and/or a remote computing device of the service provider may determine that the user has provided device care for the electronic device within one or more thresholds after the first year of a two-year service agreement. In response to this determination, the service provider may send, to a user account associated with the electronic device 100, an offer to upgrade the electronic device early, e.g., prior to the expiration of the service agreement. Alternatively, the care information may be used, at least in part, to determine a trade-in value or resale price for the electronic device.

For discussion purposes, some examples are described in the environment of rewarding a user of a portable electronic device for device care of the portable electronic device. However, the implementations herein are not limited to the particular examples provided, and may be extended to other types of care, other types of electronic devices, and so forth, as will be apparent to those of skill in the art in light of the disclosure herein.

FIG. 1 illustrates an enlarged view of an example portable electronic device 100 according to some implementations. In this example, the electronic device 100 includes components, such as a display 102 to present information to a user, a camera 104, and a microphone 106. Furthermore, implementations herein are not limited to any particular type or configuration of the electronic device 100 and thus, in some examples, the electronic device 100 may be provided without one or more of the display 102, the camera 104, and/or the microphone 106, or may have these components in different locations or different configurations. In some examples, the display 102 may have an associated touch sensor (not shown in FIG. 1), and may thereby be a touch-sensitive display that can also serve as an input device. In addition, the electronic device 100 may have various other components including various types of sensors, recognition devices, and the like (not shown in FIG. 1), that may be used for recognizing the degree of care experienced by the electronic device 100.

In some implementations, when the electronic device 100 has determined that a user has provided sufficient device care for the electronic device 100, the electronic device 100 may present a dialog box, window, graphic, or other type of UI element 108 on the display 102, such as for notifying the user of an accomplishment related to the care of the electronic device, notifying the user of a reward related to the care of the electronic device, and/or enabling a user to claim the reward related to the care of the electronic device. Thus, based on the care information, the electronic device 100 may dynamically provide a user with messages and/or rewards for device care of the electronic device 100. For instance, if the electronic device 100 determines that the user performs an activity that qualifies for a device care reward, the electronic device 100 may present the UI element 108.

Additionally, the electronic device 100 may provide the user with messages and/or may remove rewards if the user has not met one or more device care thresholds, or is danger of not meeting one or more care thresholds. For example, suppose that several messages have been presented to the user to remove an application that includes malware, but the user has not done so. The electronic device 100 may provide the user with a subsequent message that the user is approaching a threshold of failing to provide sufficient device care by not uninstalling the malicious application. Further, in some cases, if the user fails to provide sufficient device care, the electronic device may remove a reward, or a portion thereof, that has been previously awarded to the user.

As one example, suppose the electronic device 100 determines that a security fix is available for an application installed on the electronic device 100. The electronic device 100 may notify a user that an update is recommended. For instance, the electronic device may provide a UI element (not shown in FIG. 1) on the display 102 that will download and install the security fix to the electronic device 100. If the user downloads and installs the security fix, the electronic device 100 may generate device care data indicating that the user has updated the application to the most recent version. The electronic device 100 may then determine from the device care data that the user has qualified for a device care reward. Accordingly, the electronic device 100 may present the UI element 108 on the display 102, such as for enabling a user to claim a reward.

In the illustrated example, the UI element 108 includes a message 110 to the user, such as for notifying the user that the user has performed an action that qualifies for a care reward. Furthermore, the UI element 108 may include one or more interactive features, such as one or more buttons or other virtual controls 112 to enable the user to perform an action, such as for receiving the reward. Such user interaction may provide a positive reinforcement to the user. For example, after the user selects the virtual control 112, the user may be presented with an additional message or other UI element (not shown in FIG. 1), such as to indicate overall care accomplishments associated with the user and/or the electronic device, a total amount of rewards received, a graphic or other indicator of overall progress in each of a plurality of different care metrics, and so forth.

Furthermore, the electronic device 100 may include various external controls and input devices that are not shown in this example. For instance, in addition to, or in place of, a touch sensitive display, some implementations of the electronic device 100 may include a physical keyboard or keypad, a mouse, a pointing stick, a touchpad, a trackball, a joystick, a remote control, buttons and/or various other controls for performing various desired inputs and interactions with the electronic device 100. Thus, implementations are not limited to the electronic device 100 shown in FIG. 1, but may include various other types of electronic devices described herein, additional examples of which are enumerated below.

Figure 2:
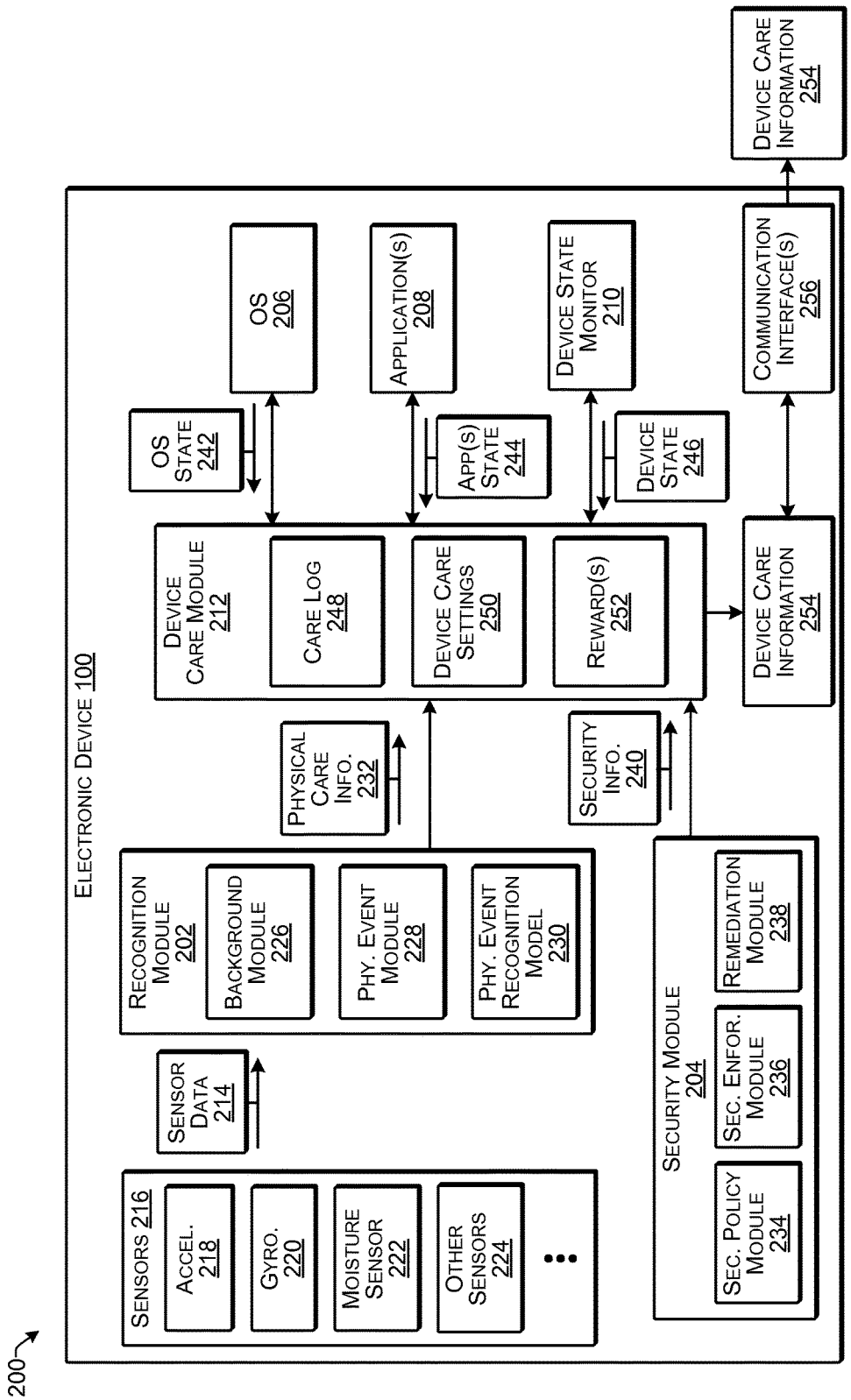
FIG. 2 illustrates an example framework for determining information related to device care on a portable device according to some implementations.

FIG. 2 illustrates an example framework for rewarding a user for device care of an electronic device according to some implementations. In this example, the electronic device 100 includes various functional components including a recognition module 202, a security module 204, an operating system 206, one or more applications 208, a device state monitor 210, and a device care module 212 that may be executed on the electronic device 100. The recognition module 202 may receive sensor data 214 from one or more sensors 216. For example, the recognition module 202 may receive input from an accelerometer 218, a gyroscope 220, a moisture sensor 222, and/or other sensors 224. Examples of various other sensors, components or devices 224 onboard the electronic device 100 that may be of use in the techniques herein may include a Global Positioning System (GPS) device, a compass, a camera, a microphone, a temperature sensor, an infrared sensor, a pressure sensor, an altitude sensor, a heart rate sensor, and the like.

As one example, when the electronic device 100 detects that it is falling, the electronic device 100 may activate the camera 204 or the microphone 106 to collect additional sensor data regarding the fall. In other examples, rather than relying on sensor information from the accelerometer 218 and/or the gyroscope 220 for detecting a fall, any of the other sensors 224 may also be used for detecting that the electronic device 100 is falling or has fallen. For example, the microphone 106 and the camera 204 may be used for fall detection based on changes in detected noise, camera point of view, and so forth. Accordingly, sensor data 214 from any combination of sensors 216 may be used for detecting and monitoring a fall in some implementations.

In the illustrated example, the recognition module 202 includes a background module 226, a physical event module 228, and a physical event recognition model 230. For example, the recognition module 226 may monitor the accelerometer 218 and gyroscope 220 for sensor data 214 indicative of the beginning of a fall event. The monitoring by the recognition module 202 may take place as a background process that samples the sensors at a low sampling rate to conserve power on the electronic device 100.

The recognition module 202 may include or may access the physical event recognition model 230, which may be a trained statistical model that receives the sensor data 214 from the recognition module 202, and determines whether the electronic device 100 is in a condition that indicates the beginning of a physical event (e.g., a fall event in this example). As one example, the physical event recognition model 230 may recognize a portion of an acceleration vector signature that indicates the beginning of a fall event, such as the acceleration vector moving in a direction toward zero.

Upon determining that a fall event has started, the recognition module 202 may then activate the physical event module 228, which may increase the sampling rate of the sensors 216 to a higher sampling rate to obtain a larger amount of sensor data 214 during the fall event. For instance, the accelerometer 218, gyroscope 220, and/or other sensors 224 may be operated to collect sensor data 214 at a lower sampling rate (e.g., from 20-100 Hz) until an indication of a physical event is detected, and then operated at higher sampling rates, e.g., (100-1000 Hz) after the indication of the physical event is detected. Alternatively, such as in the case of sensors 216 that have a fixed or constant output rate, the sampling rate at which the sensor data 214 is collected and/or stored may be increased from the lower sampling rate to the higher sampling rate. For example, if an accelerometer has a constant output data rate of 400 Hz, the recognition module 202 may sample this output at a lower sampling rate until determining that a physical event is occurring, and then sample the accelerometer 218 output at a higher sampling rate during the physical event. Similarly, in the case that the moisture sensor 222 is an active sensor, the moisture sensor 222 and/or others of the sensors 216 may be sampled at a higher rate if the physical event recognition model 230 indicates a an excessive moisture event is occurring.

The physical event module 228 may receive and store the sensor data 214 as a portion of the physical care information 232. Consequently, should the electronic device 100 fail as a result of a physical event, the sensor data 214 may still be stored up to the point of failure of the electronic device 100. In some cases, the sensor data 214 stored as part of the physical care information 232 may be extracted during servicing of a failed electronic device 100 to determine other parameters of the physical event, such as the fall height, submersion duration, device orientation, and the like. On the other hand, if the electronic device 100 survives the physical event, the physical event module 228 may continue to collect the sensor data 214 at the high sampling rate until the physical event module 228 determines that the physical event is over.

In some examples, the physical event module 228 may further calculate parameters related to the physical event. For instance, in response to a fall event, the physical event module may calculate an estimated height of the fall corresponding to the fall event, and/or an orientation of the electronic device 100 before, during and after the fall event, and may store these calculated parameters as part of the physical care information 232. Further, not all falls may be from a large enough height to be counted as a fall event that indicates insufficient care for the electronic device 100. As one example, suppose that the device care threshold for fall events is that, over a specified period of time, no falls have occurred from an estimated height of more than 24 inches above a hard surface or 48 inches over a soft surface. For instance, the sensor data may be used to determine a coefficient of restitution of the electronic device 100 following a fall (e.g., how the device responds to impacting a surface), which can indicate the nature, i.e., hardness of the surface impacted by the device during the fall. Thus, if the device falls for a duration that indicates a 40-inch fall, but the coefficient of restitution is low, then this may indicate that the surface is a soft surface and there would be no damage to the device. On the other hand, if the coefficient of restitution is high, then this may indicate that the surface is a hard surface, and the device may have been damaged.

In addition, in response to an excessive moisture event, the physical event module 228 may further calculate the duration of the excessive moisture event corresponding to an excessive moisture event, and an orientation of the electronic device during the excessive moisture event. The physical event module may store these calculated parameters as part of the physical care information 232. As one example, a device care threshold for receiving a reward for this device care metric might be that no submersion events or other excessive moisture events have occurred during the specified time period. Additional moisture events may further be determined depending on the nature of the moisture sensor. For example, the moisture sensor may be configured to detect moisture if the electronic device is left in the rain, sprayed with liquid, or otherwise exposed to water or other liquid without being submerged. Such events may also be detected, and various device care thresholds may be set based on the detection capability of the moisture sensor. Further, while several types of physical care metrics have been discussed herein, other physical care metrics may also be tracked for determining a level of device care in other examples.

In additional to physical events, system events may also be monitored to determine a level of device care. Such system events may include detecting security events, such malicious activity by an application or other piece of code on the electronic device 100; receiving an indication that an update to an application or the operating system is available; receiving an indication that the battery or other system component is being operated in a state that could damage the battery or other system component, and so forth.

As one example, the security module 204 may identify malicious activity, prevent potentially malicious activity, and perform remediation in response to the detection of malicious activity. For instance, the security module 204 may determine that an application a user intends to install on the electronic device 100 is malware. Further, the security module 204 may recommend against the installation of the application or may prevent the installation of the application based upon the determination. Further, the security module 204 may determine that a previously installed application 208 includes malware, and may recommend the user uninstall the application 208.

In the illustrated example, the security module 204 includes a security policy 234, a security enforcement module 236, and a remediation module 238. For example, the security policy 234 includes security settings that may define permitted activities and permitted access on the electronic device 100. In some implementations, the security policy 234 may provide information describing one or more applications that may be potentially malicious. For example, the security policy 234 may include a whitelist that lists applications that have been deemed safe and/or a blacklist that list applications that have been deemed malicious and/or unsafe. Further, the security policy 234 may include whitelists and/or blacklist identifying one or more potentially malicious email addresses, Internet Protocol addresses, and websites. In some implementations, the security policy 234 may further contain one or more signatures identifying potentially malicious applications or files. Further, the security policy 234 may contain security settings associated with content item ratings or user ratings. For example, the security policy 234 may specify that one or more users of the electronic device 100 may not access applications or content items having a rating that identifies adult or graphic content.

In some implementations, the security policy 234 may include one or more rules identifying one or more activities that are deemed to be potentially malicious. Further, the security policy 234 may contain a data structure defining permissions of users and/or applications 208 of the electronic device 100. For instance, the security policy 234 may include an access control list specifying applications a user is permitted to execute and permission rights of the applications to one or more files and/or folders of the electronic device 100.

The security enforcement module 236 may enforce the security policy 234 of the security module 204. If a user or application 208 of the electronic device 100 attempts an activity, the security enforcement module 236 may permit or deny the activity in accordance with the security policy 234. For example, if a user requests to install an application on the electronic device 100, the security enforcement module 236 may determine whether a whitelist defined in the security policy 234 contains an identifier of the application. If the whitelist does not include the identifier of the application, the security enforcement module 236 may deny the user request.

In some implementations, the security enforcement module 236 may provide recommendations to a user in accordance with the security policy 234. For instance, a user may request to access a content item on the electronic device 100. The security enforcement module 236 may determine whether the content item is malicious or prohibited based upon the security policy 234. If the security enforcement module 236 determines the content item is potentially malicious or prohibited, the security enforcement module 236 may provide a notification to the user recommending the user not access the content item. As another example, the user may request that an email application open an email containing an attachment. The security enforcement module 236 may identify the attachment as potentially malicious, and notify the user that the attached file may include malware.

In some implementations, the security enforcement module 236 may monitor installed applications 208 for potentially malicious behavior. For instance, the security enforcement module 236 may monitor the execution of an application 208 and/or may monitor execution logs associated with the application 208 for malicious behavior. In some implementations, the security policy 234 may include information identifying an activity as malicious behavior. If the security enforcement module 236 detects an application performing the activity, the security enforcement module 236 may flag the application 208 as potentially malicious. For example, the security policy 234 may define communication with a blacklisted Internet Protocol (IP) address as malicious behavior. If the security enforcement module 236 detects that an application 208 is attempting to communicate with the blacklisted IP address, the security enforcement module 236 may determine that the application is exhibiting malicious behavior.

If the security enforcement module 236 detects malicious behavior by an application 208 or other piece of code, the remediation module 238 may perform remediation techniques to mitigate the dangers posed by the malicious application 208 or other malicious code. For instance, the remediation module 238 may remove the application 208 or other code from the electronic device 100. For example, if the security enforcement module 236 determines that an application 208 installed on the electronic device 100 is communicating with an IP address associated with spyware programs, the remediation module 238 may remove the application 208 from the electronic device 100. In some implementations, the security module 204 may recommend to a user of the electronic device 100 that the application 208 or other malicious code be removed from the electronic device. In some examples, the remediation module 238 may quarantine a potentially malicious application 208 or other malicious code.

In some implementations, the security module 204 may generate data associated with the security enforcement module 236 and the remediation module 238, and store at least portions of the data as security information 240. For instance, the security module 204 may store as security information 240 data representing applications 208 identified by the security enforcement module 236 as potentially malicious. Further, the security module 204 may store security information 240 data representing remediation solutions that have been recommended and/or performed by the remediation module 238. In some implementations, the security information 240 may contain a record detailing whether a user has followed the recommendations of the security model 204 and/or adhered to the security policy 234.

As mentioned above, the electronic device 100 may include the operating system 206 and one or more applications 208. The operating system 206 may generate an operating system state 242 representing the properties of the operating system 206. The operating system state 242 may include an identifier of the operating system 206, a version identifier of the operating system 206, and one or more integrity identifiers representing an integrity value of the operating system 206. Further, the applications 208 may generate an application state 244 representing the properties of the one or more applications 208. The application state 244 may include application identifiers for each of the one or more applications 208, version identifiers for each of the one or more applications 208, and integrity identifiers representing integrity values of each of the one or more applications 208.

The integrity values may be a representation of the authenticity of the operating system 206 or an application 208. For instance, the integrity value may indicate that the executable code of an operating system 206 or application 208 has been compromised. In some implementations, the integrity value may be based in part on a comparison between an actual checksum, signature, certificate, and/or other form of identification of the executable code, and an expected checksum, signature, certificate, and/or other form of identification of the executable code. In some implementations, the security module 204 may determine the integrity value of the operating system 206 or one or more applications 208. Further, if the electronic device 100 determines that the integrity of the operating system 206 or an application 206 is compromised, the electronic device 100 may recommend repair or reinstallation of the operating system 206 or application 208. In some examples, the remediation module 238 may perform or initiate the repair or reinstallation process.

In some examples, the device state monitor 210 may generate a device state 246 associated with one or more hardware components of the electronic device 100. The device state monitor 210 may collect data associated with one or more hardware components of the electronic device 100, and store the data as the device state 246. For example, the device state monitor 210 may generate data representing the duration of time a user operates the electronic device 100 while the battery is below a specific threshold. Further, the device state monitor 210 may determine whether the battery charging practice of a user is a source of an abnormal decrease in a charge cycle capacity of the electronic device 100.

In some implementations, the electronic device 100 may notify a user of best practices for maintaining battery health. In another example, the device state monitor 210 may monitor the data storage practices of a user. For example, the device state monitor 210 may generate data representing the percentage of available storage space on the electronic device 100. Further, the device state monitor 210 may inspect the health (e.g., defective sectors, etc.) of the storage elements of the electronic device 100. In some implementations, the electronic device 100 may notify a user of best practices for maintaining the health of one or more storage elements of the electronic device 100. In still other examples, the device state monitor 210 may track reboot information and/or data associated with the performance of a proper shutdown procedure with respect to the electronic device 100.

In some examples, the device care module 212 may determine whether a user has qualified for a device care reward. The device care module 212 may include a care log 248, device care settings 250, and a reward 252. The device care module 212 may receive the physical care information 232 from the recognition module 202, the security information 240 from the security module 204, the operating system state 242 from the operating system 206, the applications state 244 from the one or more applications 208, and the device state 246 from the device state monitor 210. In the illustrated example, the device care module 212 stores the received information in the care log 248.

The device care settings 250 may define one or more activities that qualify as sufficient device care of the electronic device 100. In some implementations, the device care module 212 may process the care log 248, and determine if any of the care log 248 information qualifies a user for a device care reward described in the device care settings 250. Alternatively, the device care module 212 may determine a value of the electronic device, such as a trade-in value or resale value, based at least in part on the care log 248. For instance, if the care log 248 indicates that the electronic device 100 has sustained very few physical events, the device care module 212 may determine that electronic device 100 has held its purchase value. As another alternative, as discussed below, in some examples a computing device of a service provider may determine whether a user has qualified for a care reward and perform the other functions of the device care module 212.

In some examples, the device care settings 250 may include rewards for the completion of one or more device care goals, i.e., satisfying one or more device care thresholds. For example, the removal of a malicious application may qualify a user for a reward. In some examples, the device care settings 250 may include rewards for maintaining a specified state over a period of time. For example, a reward may be provided to a user for the timely installation of software updates to the electronic device 100 during a three-month period. In another example, a reward may be provided to the user if the electronic device 100 determines that the integrity of the operating system 206 and/or applications 208 has not been compromised over a period of time.

In some examples, a reward may be provided for the absence of an act of insufficient care over a period of time. For example, a reward may be provided to a user if the user does not install any blacklisted applications to the electronic device 100 during a one-month period. In another example, a reward may be provided to a user if the electronic device 100 determines the electronic device 100 has not experienced any excessive moisture events over a period of time. In another example, a reward may be provided to a user if the electronic device 100 determines the electronic device 100 has not experienced any fall events over a period of time. In some implementations, the device care settings 250 may specify that a reward event may be provided to a user if the electronic device 100 determines that there have not been any physical events surpassing a specified threshold (e.g., fall acceleration, fall height, moisture level, etc.). Further, in some implementations, a user may be rewarded for prolonged periods of sufficient device care by having rewards increase exponentially with time.

The device care module 212 may further include reward (s) 252. In some implementations, the device care module 212 may provide reward(s) 252 as in response to determining that the user has met at least one threshold for device care. Reward(s) 252 can be implemented in many ways, and can comprise a wide variety of tangible and intangible objects. Reward(s) 252 may have some type of monetary or pseudo-monetary value in conjunction with certain activities or promotions. Further, a reward 252 may include graphically-presented badges on a social network. In some examples, the reward 252 may be purchase credits or gift certificates. In still other examples, the reward 252 may provide access to resources, rights, or capabilities associated with digital content, such as may be accessed using the electronic device 100. For instance, the reward 252 may be used to make in-application purchases on the electronic device 100.

Further, a user of the electronic device may redeem the reward 252 for goods or services. As one example, the user may use the reward to purchase electronic books, music, videos, applications, or other content items that can be accessed on the electronic device. For instance, suppose that a user receives a reward of fifty credits for the removal of malware from the electronic device 100. Further, the user may later exchange the fifty credits for a monetary discount during a purchase, or may use the fifty credits to pay for an entire purchase, depending of the value of the item purchased.

In some implementations, the device care module 104 may further generate care information 254 including at least a portion of the information contained in the care log 248 and/or related device care settings 250. In some examples, the care information 254 may include reward qualifying information and/or reward disqualifying information. For instance, the care information 254 may include a record of one or more physical events the electronic device 100 has sustained and a user responsible for the physical event.

In some examples, the electronic device 100 may include at least one communication interface 256. The communication interface 256 may include one or more interfaces and hardware components for enabling communication with various other devices, such as other electronic devices 100 or other computing devices, such as directly or over a network. For example, the communication interface 256 may facilitate communication through one or more of the Internet, cable networks, cellular networks, wireless networks (e.g., Wi-Fi, cellular) wired networks, direct wireless or wired connection, close-range communication (e.g., Bluetooth® communications) near-field communication, and so forth. Thus, the communication interface 256 may be used to transmit care information 254 to another device, a network, etc. In some cases, the device care module 212 may begin to send care information 254 as soon as a care related activity is performed by a user and/or occurs on the electronic device 100. For instance, the device care module 212 may transmit care information 254 including sensor data 214 collected and transmitted in real time as the electronic device 100 is falling or being submerged. Additionally, or alternatively, the care information 254 may be stored on the electronic device 100 and transmitted periodically or following the occurrence of a care-related event that meets one or more thresholds for transmitting the care information 254.

In addition, numerous other types of user behavior may be rewarded. For example, the application state information 244 may indicate application usage information, e.g., how frequently and/or for how long a user interacts with one or more specific applications 208 on the electronic device 100. Suppose that the applications 208 include an educational application, such as a math application, a reading application, or the like. The application state 244 may indicate usage information for this application. As one example, the user may be eligible for a reward if the user has interacted with this application for more than a threshold length of time over the past week, past month etc.

As another example, the device care module may be used to monitor user behavior that is beneficial to the user, rather than the electronic device, such as behavior that may make the user eligible for discounts on insurance, etc. For instance, the sensor data 214 may be used to determine that the user has visited a health club three days per week for the past month, which may make the user eligible for a discount on health insurance. As discussed below with respect to FIG. 11, the electronic device 100 may inform the user that the electronic device 100 can automatically provide this information to the user's health insurance company to make the user eligible for the discount.

Figure 3:
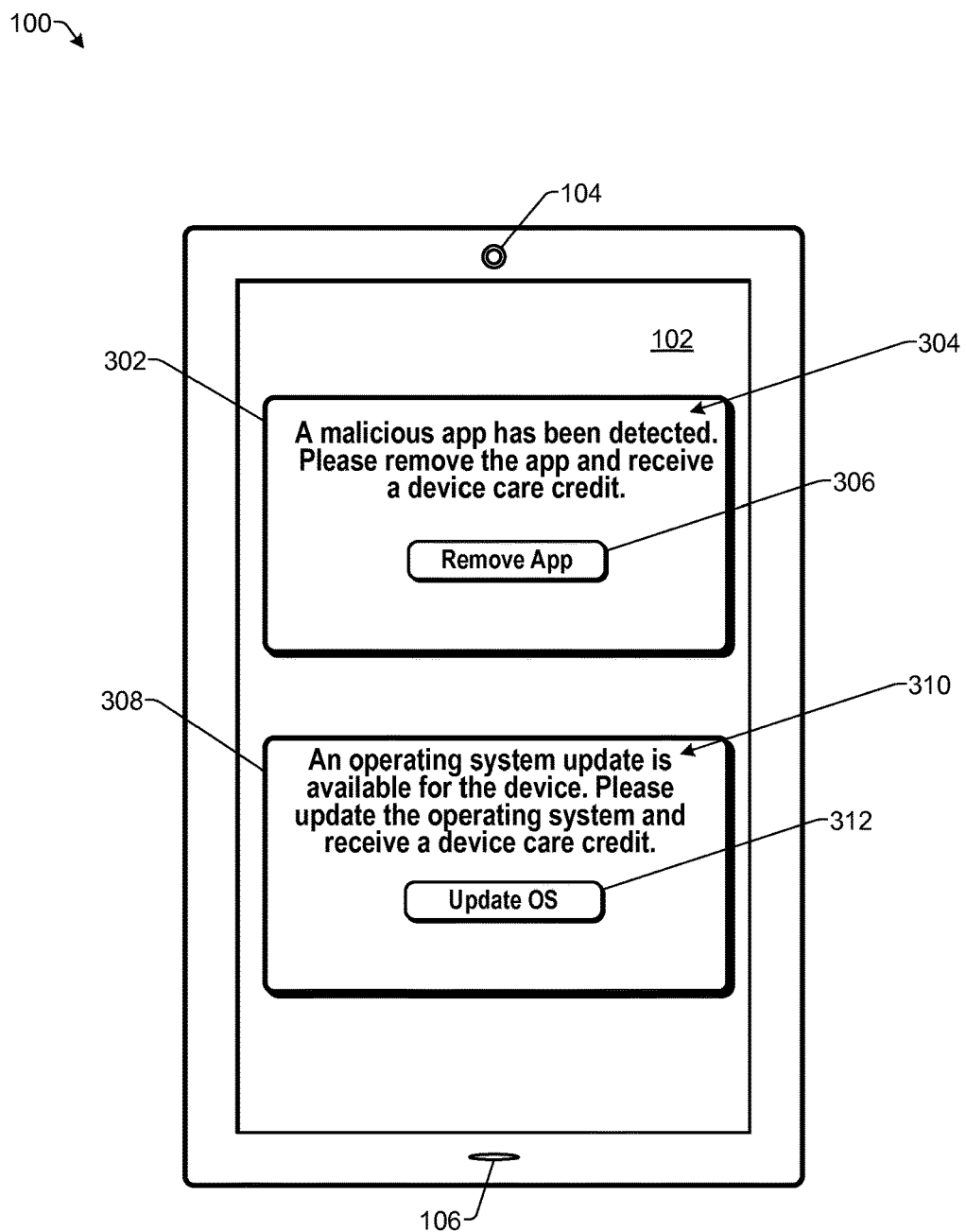
FIG. 3 illustrates example user interfaces for encouraging device care according to some implementations.

FIG. 3 illustrates an example banner, window, graphic, or other UI element 302 that may be presented to a user according to some implementations. For example, when the electronic device 100 identifies a malicious application installed on the electronic device 100, a user may be presented with the UI element 302 providing a notification regarding the malicious application. In this example, the UI element 302 includes a message 304 indicating the detection of a malicious application on electronic device 100. Further, the message indicates that the removal of the malicious application will qualify the user for a reward. For instance, a reward may have monetary value, pseudo monetary value, or no monetary value. The UI element 302 further includes a button or other virtual control 306 adjacent to the message 304, which the user may select to initiate a process to remove the malicious application. After the malicious application has been removed, the user may receive a reward from the device care module 212, such as through presentation of a UI element similar to that discussed above with respect to FIG. 1. In some implementations, as discussed above, the security enforcement module 236 may detect the malicious application on the electronic device 100. Further, in some implementations, the remediation module 238 may remove the malicious application from the electronic device 100.

FIG. 3 further illustrates an example banner, window, graphic, or other UI element 308 that may be presented to a user according to some implementations. For example, when the electronic device 100 determines that the operating system of the electronic device is out of date, the electronic device 100 may present the UI element 308 for providing a notification regarding the operating system 206. In this example, the UI element 308 includes a message 310 indicating the operating system is out of date on electronic device 100. Further, the message 310 indicates that updating the operating system qualifies the user for a reward. The UI element 402 further includes a button or other virtual control 312 adjacent to the message 310 to initiate an update process for the operating system. As mentioned above, the device care module 212 may provide the user with a reward after the operating system is updated. In some implementations, the operating system state 242 may be used to determine the operating system is out of date and in need of an update.

Figure 4:
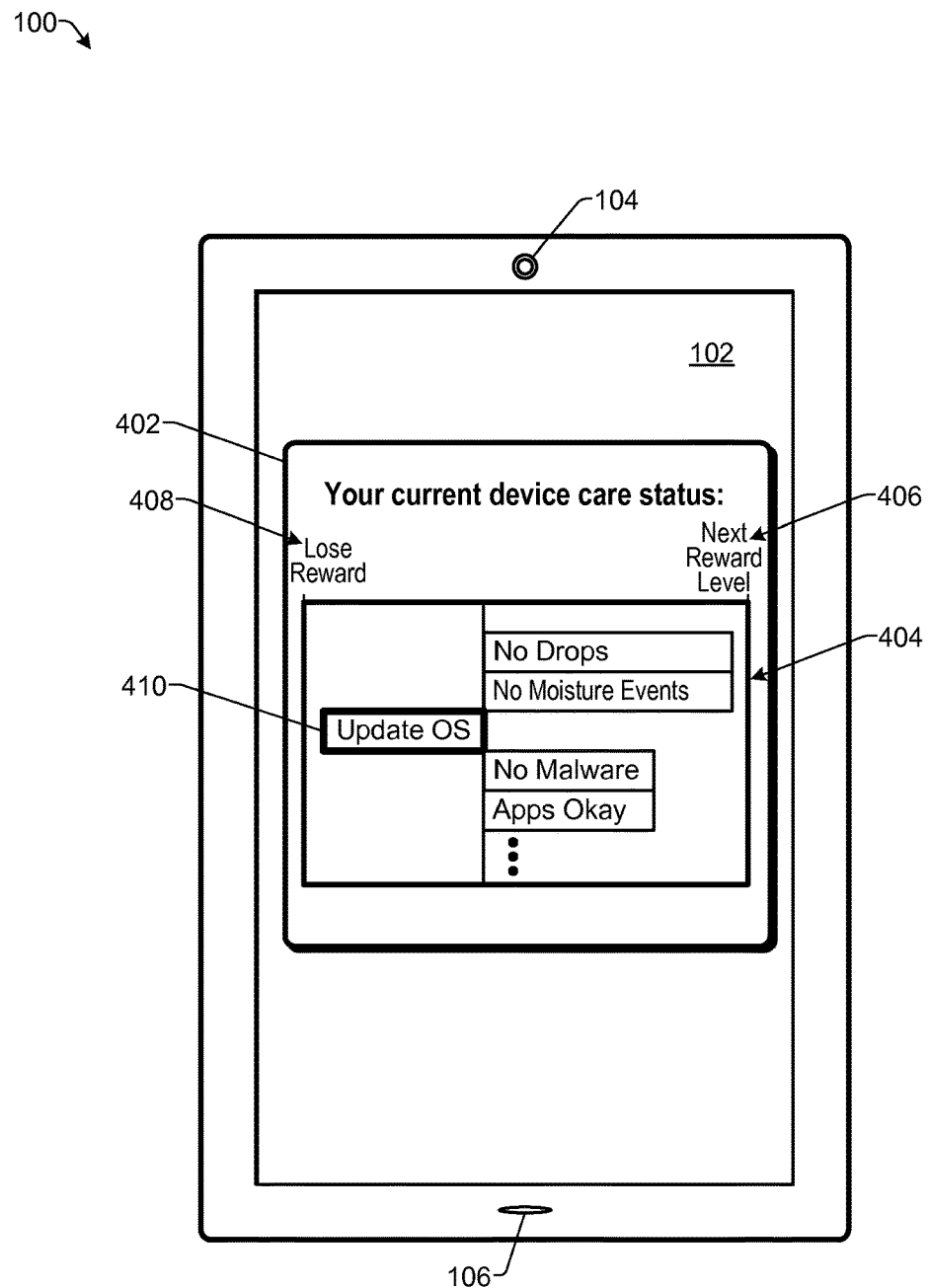
FIG. 4 illustrates an example user interface for indicating a device care status according to some implementations.

FIG. 4 illustrates an example banner, window, graphic, or other UI element 402 that may be presented to a user according to some implementations. For example, when a user accesses or uses the electronic device 100 after a period of time, the user may be presented with the UI element 402 providing a status of the user's care activity, such as in a graphical format. In the illustrated example, the status of the care activity is presented as a bar graph 404 that indicates the current status of care activity for a plurality of care metrics, such as whether there have been any fall events (drops) detected, whether there have been any submersion events or other excessive moisture events, whether the operating system has been updated, whether any malware has been detected, whether any applications require updating, and so forth. For instance, the bar graph 404 may indicate incremental progress in each care metric since a last reward point, and may indicate how close the user is to achieving a next reward 406 for each reward metric.

In some cases, the user may receive rewards based on achievements in individual care metrics. In other cases, the user may be required to achieve a threshold in all metrics before a reward is awarded. Additionally, the status indicator may indicate if the user is at risk of losing a reward as indicated at 408. For example, if the user has not updated the operating system after receiving one or more messages, the bar graph 404 may indicate negative progress in this care metric, as indicated at 410. Thus, if the user continues to ignore messages regarding updating the operating system, the bar at 410 may incrementally approach the point 408 at which the user may have a reward taken away. Further, while a bar graph is illustrated in this example, any other suitable graphic or other UI element may be used to convey the progress information for individual care metrics.

Figure 5:
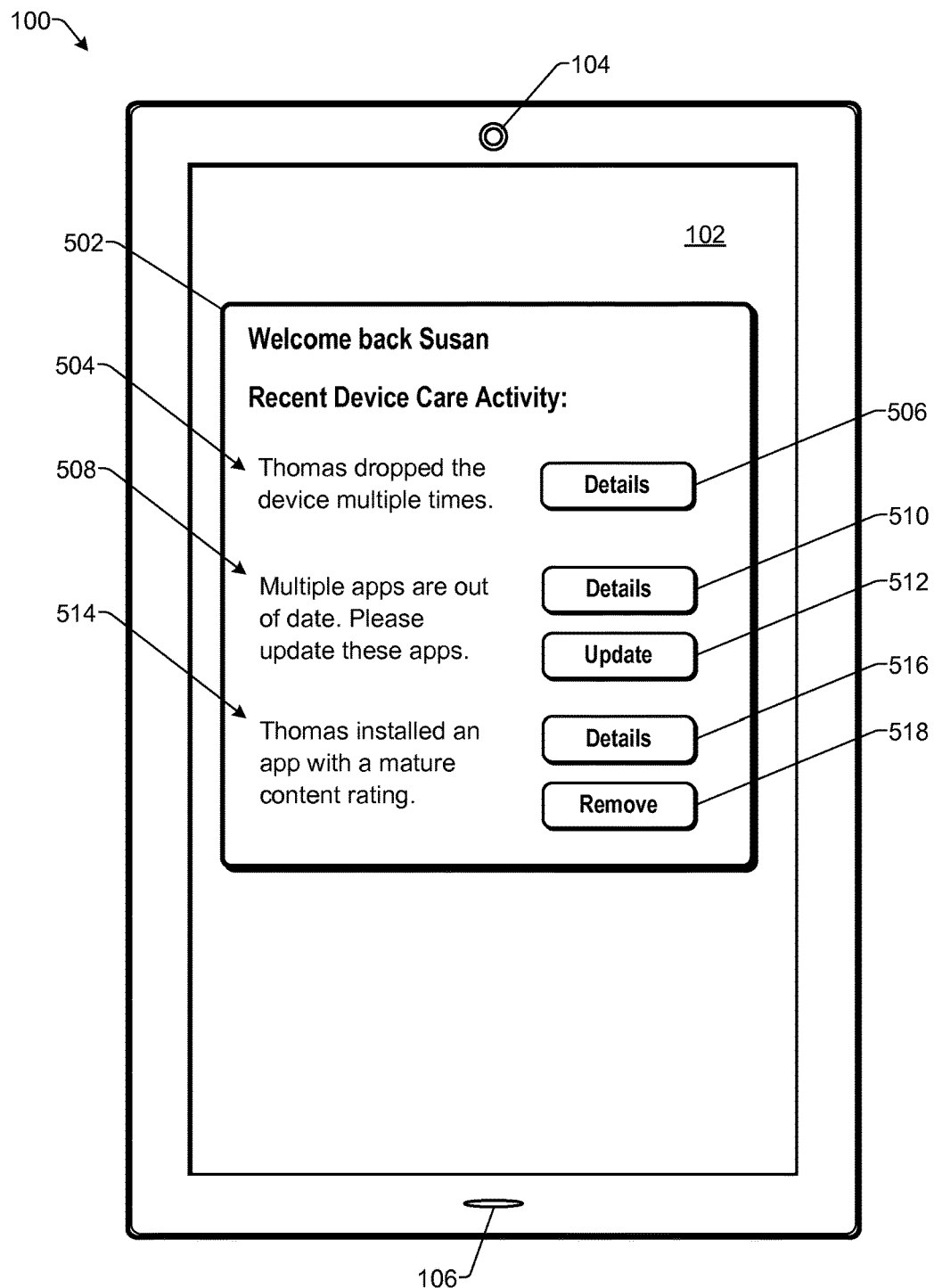
FIG. 5 illustrates an example user interface for indicating a device care status according to some implementations.

FIG. 5 illustrates an example banner, window, graphic, or other UI element 502 that may be presented to a user according to some implementations. For example, when a user accesses or uses the electronic device 100 after a period of time, the user may be presented with the UI element 502 providing a summary of recent care information 254. In the illustrated example, the UI element 502 is configured to be presented to a parent of a user, and thus, may be accessible in some examples through a parental control interface or the like. In other examples, of course, the UI element 502 may be presented to the user, rather than to a parent.

The UI element 502 may present recent activity that may disqualify one or more users of the electronic device 100 from receiving a device care reward, or which may result in the subtraction of a care reward. Further, the UI element 502 may present actions a user may take to qualify for one or more device care rewards. In this example, the UI element 502 includes a message 504 indicating that user Thomas has recently dropped the electronic device 100 multiple times. The UI element 502 further includes a details button or other virtual control 506 adjacent to the message 504 to enable the user to obtain more details regarding the fall events of the electronic device 100. For example, the user may select the details virtual control 506 to determine when the user Thomas dropped the electronic device 100, a value representing the physical damage sustained by the electronic device 100 during the fall event, whether the fall event was accidental or intentional, and so forth. For instance, an accidental drop of an electronic device may have significantly different acceleration signatures than if the electronic device is thrown. Consequently, this information may be conveyed in the details.

In addition, in the example of FIG. 5, the UI element 502 includes a message 510 indicating that multiple applications 208 installed on the electronic device 100 are out of date and in need of an update. For example, the user may select the adjacent details button or other virtual control 506 to learn which applications 208 installed on the electronic device 100 are in need of an update. Further, the user may select update virtual control 508 to initiate a process to update the one or more applications 208 that are in need of an update.

In addition, in the example of FIG. 5, the UI element 502 includes a message 514 indicating that user Thomas has installed an application with a mature content rating. For example, the user may select the adjacent details virtual control 516 to learn more about the application installed by the user Thomas on the electronic device 100. Further, the user may select the remove virtual control 518 to remove the application 208 from the electronic device 100.

Figure 6:
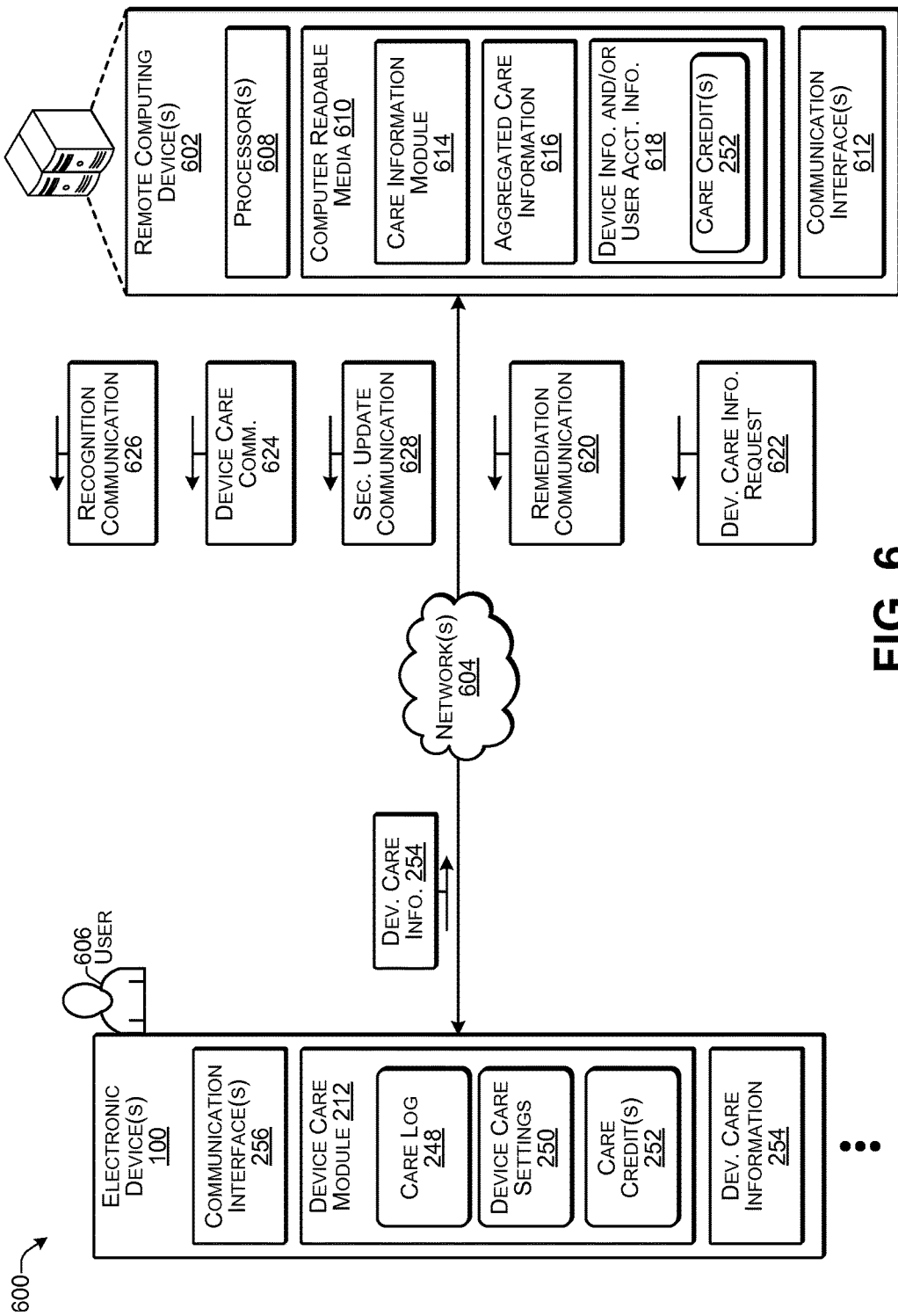
FIG. 6 illustrates an example system architecture for providing one or more rewards to encourage care of a portable device according to some implementations.

FIG. 6 illustrates an example system 600 that may be employed to provide a reward for sufficient care of the electronic device 100 according to some implementations. For instance, in some examples, the electronic device 100 may automatically send care information 254 to one or more remote computing devices 602, such as over a network 604. The remote computing device 602 may be provided by a service provider, such as an entity that provides, sells, or leases the electronic device 100 to a user 606, or that provides content items or services to the electronic device 100 and the user 606.

In the illustrated example, each remote computing device 602 may include one or more processors 608, one or more computer-readable media 610, and one or more communication interfaces 612. The processor(s) 608 may be a single processing unit or a number of processing units, and may include single or multiple computing units or multiple processing cores. The processor(s) 608 can be configured to fetch and execute computer-readable instructions stored in the computer-readable media 610 or other computer-readable media.

The computer-readable media 610 may include volatile and nonvolatile memory and/or removable and non-removable media implemented in any type of technology for storage of information, such as computer-readable instructions, data structures, program modules or other data. Such computer-readable media includes, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store the desired information and that can be accessed by a computing device. Depending on the configuration of the computing device 602, the computer-readable media 610 may be a type of computer-readable storage media and may include tangible non-transitory storage media.

The communication interface(s) 612 may include one or more interfaces and hardware components for enabling communication with various other devices, such as the electronic device(s) 100 or other computing devices, over the network(s) 604. For example, communication interface(s) 604 may facilitate communication through one or more of the Internet, cable networks, cellular networks, wireless networks (e.g., Wi-Fi, cellular) and wired networks. For instance, the network(s) 604 may include any suitable network, including an intranet, the Internet, a cellular network, a local area network (LAN), a wide area network (WAN), a virtual private network (VPN) or any other network or combination thereof. As several examples, the remote computing device 602 and the electronic device 100 may communicate and interact with one another using any combination of suitable communication and networking protocols, such as Internet protocol (IP), transmission control protocol (TCP), hypertext transfer protocol (HTTP), cellular or radio communication protocols, and so forth.

In some examples, the remote computing device 602 may include a care information module 614, which may receive care information 254 from the electronic device(s) 100. For example, the care information module 614 may store the care information 254 as aggregated care information 616. In some examples, the care information module 614 may associate particular care information 254 with a particular electronic device 100 or with a particular user account, device account or other device and/or user information. For example, the remote computing device 602 may maintain device information and/or user account information 618, which may include any of a device identifier, such as a device serial number, device account information, user account information, user information, and or any combination thereof. In some cases, the care information module 614 may maintain information regarding the reward(s) 252 earned by the user in association with the user account 618. For instance, the care information module 614 may determine the reward(s) 252 to which the user is entitled based on receiving the device care information 254 from the electronic device 100. Accordingly, the remote computing device 602 may determine and maintain the reward(s) 252 in addition to, or in place of the electronic device 100 determining and maintaining the reward.

In some cases, the remote computing device 602 may receive care information 254 from a particular electronic device 100 and may associate the received care information 254 with a record maintained for the particular electronic device 100. For instance, if the care information 254 indicates that the electronic device 100 has an out of date application 208 installed on the electronic device 100, the care information module 614 may send a remediation communication 620 to the electronic device 100, such as to recommend that the electronic device 100 update the application 208. In some examples, the remediation communication 620 may also include the data needed to update the out of date application 208. Further, in some examples, the care information module 614 may determine whether the user 608 of the electronic device 100 has qualified for a reward.

In some examples, the user 606 of an electronic device 100 may be able to opt in to a service offered by the service provider in which the user 606 may trade in an old electronic device 100 for a new electronic device 100 on a regular basis, such as on a yearly basis or the like. For instance, the user 606 may receive a higher trade-in value for replacing a used electronic device 100 based on the device care information 254 received from the used electronic device 100. If the device care information 254 indicates that the used electronic device 100 has been well cared for, i.e., the user has not dropped the device, has not gotten the device wet, and has responded timely to device care messages, then the user may be offered a higher trade-in value or resale value for the used electronic device 100 than may be the case if the device care information shows the device has not been well treated, or if the user opts out of having the device care information shared with the service provider.

In addition, the user 606 may receive a higher trade-in value based upon device information and/or user account information 618 associated with the user 606. For instance, if the device information and/or user account information 618 indicate that the user 606 has a history of providing device care that meets one or more device care thresholds, then the user 606 may be offered a higher trade-in value or resale value for the used electronic device 100 than may be the case if the device information and/or user account information 618 associated with the user 606 does not indicate a history of providing device care. In some examples, an empirical determination may be made of the differences in the actual value of devices traded-in by users who participated in the device care program vs. devices traded in by users who did not participate. For example, the cost of repair or refurbishment of each device may be used to determine, at least in part, the appropriate trade-in value of a particular device based on probable repair or refurbishment that will be needed in view of the device care information for the particular electronic device.

Resale values for used electronic devices 100 may be determined in a similar manner. For instance, the service provider may provide a used device market place, and may provide an extended warranty on devices of users that have opted in to the device care program. Thus, these devices may be offered at a higher price than devices of users that opted out of the device care program, or that opted in but did not meet one or more device care thresholds.

The electronic device 100 may include the one or more communication interfaces 256 that, in some implementations, may be of a similar configuration to the communication interfaces 612 discussed above. Accordingly, the device care module 212 of the electronic device 100 may utilize the communication interface 256 to send the care information 254 to the remote computing device 602, such as on a periodic basis. In other examples, the electronic device 100 may send the care information 254 following the occurrence of a device care related activity, or following the occurrence of a threshold number of device care related activities, such as five, ten, etc. In still other examples, the electronic device 100 may send the care information 254 to the remote computing device 602 following the occurrence of a device care related activity that exceeds a particular threshold. For example, in the case of a physical event, the electronic device 100 may send care information 254 following a physical event that exceeds a particular fall height threshold, a fall duration, a submersion duration, or other moisture exposure duration. In still other examples, the electronic device 100 may send the care information 254 to the remote computing device 602 in response to receiving a device care information request 622 from the remote computing device 602. For example, the computing device 602 may periodically poll the electronic device 100 or may send another type of communication requesting that any stored care information 254 be sent to the remote computing device 602.

In some examples herein, the user 606 may have the option to turn off or turn on, install or uninstall, etc., the device care module 212 on the electronic device 100. Furthermore, in some cases, the user 606 may be able to set preferences for the security module 204 (not shown in FIG. 6), such as automating the performance of remediation techniques, and automating updates to the operating system and/or one or more applications. In some examples, the user may receive a reward for automating remediation and/or software updates. In other examples, the device care module 212 may be part of the operating system or other larger module that executes on the electronic device 100, and may be inaccessible to the user 606 or may require authorization to access.

In some examples, the remote computing device 602 may send a device care communication 624 to the electronic device 100. The device care communication 624 may include device care settings to add and/or edit the current device care settings 250 of the electronic device 100. In some examples, the device care communication 624 sent by the remote computing device 602 may be sent to one or more electronic device(s) 100 and may represent a centralized policy instituted by a service provider associated with electronic device 100 and/or remote computing device 602. For instance, the device care communication 624 may contain device care settings, which may provide a reward for minimizing use of the electronic device(s) 100 when the battery is at less than, e.g., 35% of full capacity. Further, the device care information contained in the device care communication 624 may be based in part on analysis of the aggregated care information 616. In still other examples, the device care communication 624 may contain device care information that is particular to the electronic device 100 and/or the user 606. For instance, if the device information and user information 618 indicates that the electronic device 100 belongs to a user 606 that frequently purchases content items from a service provider, the device care communication 624 may include information that edits the existing device care settings 250 to include rewards associated with content items offered by the service provider. In still other examples, if the device information and user information 618 indicates that the user 606 has recently purchased a protective cover for the electronic device 100, the device care communication 624 may include information updating device care settings 250 related to fall events.

In some implementations, the remote computing device 602 may send a recognition communication 626 to the electronic device 100. The electronic device 100 may modify the functionality of the recognition module 202 of the electronic device 100 using the data contained in the recognition communication 626. In some implementations, the recognition communication 626 may contain an update to the physical event recognition model 230 (not shown in FIG. 6).

In some implementations, the remote computing device may send a security update communication 628 to the electronic device 100. The security update communication 628 may include data that provides enhanced functionality to the security module 204 (not shown in FIG. 6). For instance, if the device information and user information 618 indicates that the user 606 is a minor, the security update communication 628 may include one or more websites to add to a blacklist of websites with graphic content stored in the security module 204 (not shown in FIG. 6). In another example, the security update communication 628 may include one or more new malware definitions that may be used by the security module 204 (not shown in FIG. 6) to detect malicious behavior.

In addition, in some examples, the care information module 614 may analyze the aggregated care information 616 obtained from a plurality of electronic devices, by comparing the device care information 254 received from a first electronic device with that received from one or more other electronic devices 100 to identify patterns or trends in the device care information 254. For example, the care information module 614 may identify a fall height at which particular models of an electronic device 100 tend to experience catastrophic failure, and may provide this information to the designer or manufacturer of the particular model of electronic device. Further, the care information module 614 may set certain care thresholds, such as drop heights, permissible low battery levels, and so forth, based on the comparison of the device care information 254 across multiple devices. In still other examples, the resale value or trade-in value of the used electronic device 100 may be based in part on the aggregated care information 616. For instance, if the device care information 254 indicates that the electronic device 100 has been subjected to above average care as compared to a representative average device determined from the aggregated care information 616, then the user 606 may be offered a higher trade-in value or resale value for the used electronic device 100 than may be the case if the device care information 254 shows the device 100 has been subjected to below average care.

Figure 7:
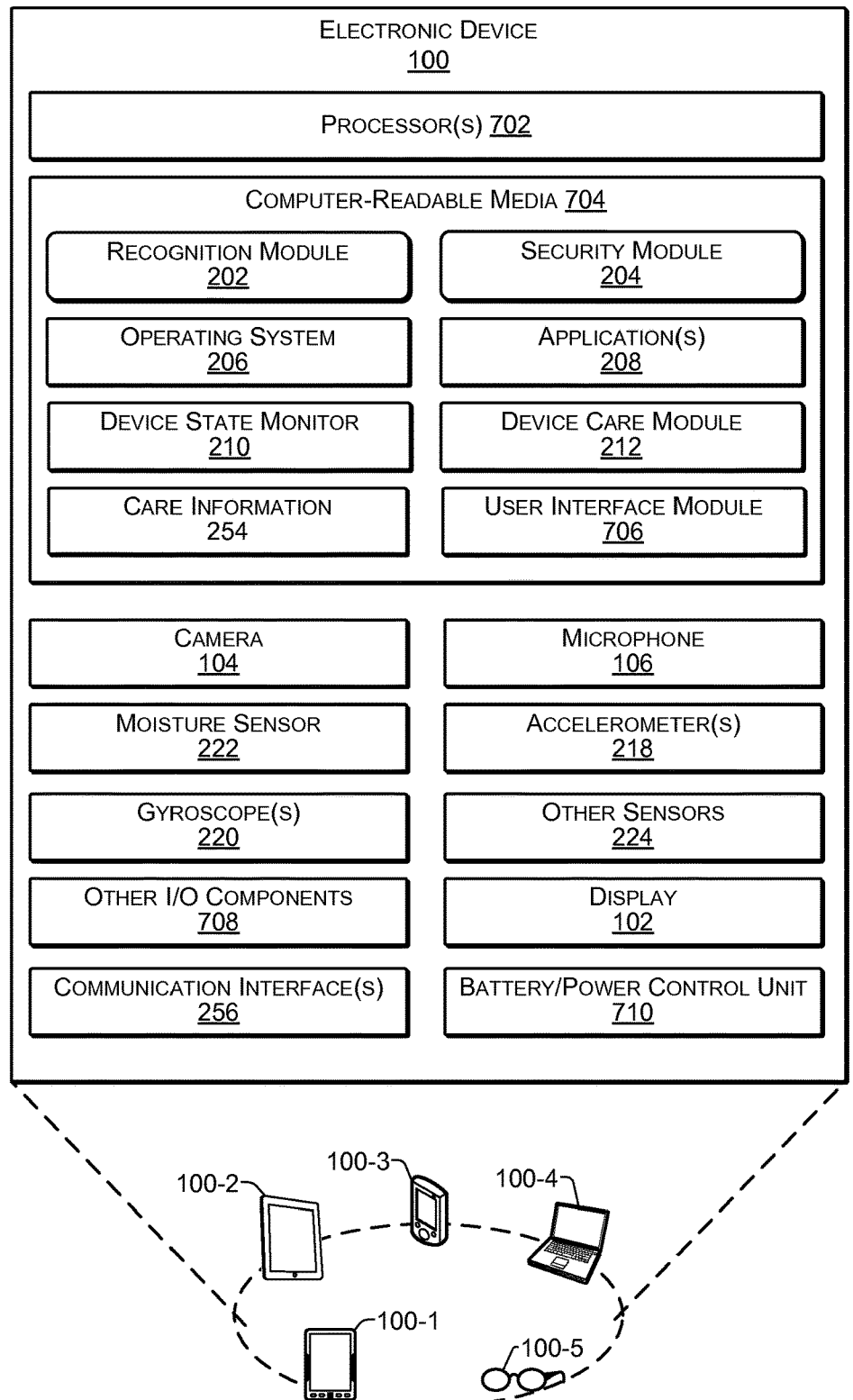
FIG. 7 illustrates an example portable device according to some implementations.

FIG. 7 illustrates select example components of the electronic device 100 that may be used to implement the techniques and functions described herein according to some implementations. Some common examples of the electronic device 100 may include digital media devices and eBook readers 100-1; tablet computing devices 100-2; desktop computing devices, terminals, and workstation computing devices 100-3; smart phones and mobile devices 100-4; laptop and netbook computing devices 100-5; televisions, gaming systems, and home and automotive electronic devices 100-6; and wearable electronic devices 100-7. For instance, the electronic device 100 may be a user-transportable device, a mobile device, or other portable device, such as a cellphone, a smart phone, a tablet computing device, an electronic book (eBook) reader device, a media player, a navigation device, a portable gaming device, a laptop computer, or other typically handheld devices that are easily passed between users. Additionally, in some examples herein, the electronic device 100 may be a wearable device or a device that is otherwise transported by a user, such as headphones, a helmet, augmented reality glasses, an article of clothing, a device retained in an armband or supported on a belt, a watch, a bracelet, an anklet, or any other portable or mobile electronic device having components capable of performing the recognition functions described herein, and that may be moved by, carried by, worn by, or supported by a person. Additionally, in some examples, herein, the electronic device may not be a handheld or user-transportable device, an instead may be a less mobile device such as a television, desktop computer, automotive electronic device, gaming console, appliance, tool and the like.

In a very basic configuration, the electronic device 100 includes, or accesses, components such as at least one control logic circuit, central processing unit, or processor 702 and one or more computer-readable media 704. Each processor 702 may itself comprise one or more processors or processing cores.

In addition, depending on the configuration of the electronic device 100, the computer-readable media 704 may be an example of tangible non-transitory computer-readable media and may include volatile and nonvolatile memory and/or removable and non-removable media implemented in any type of technology for storage of information, such as computer-readable instructions, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid-state storage and/or magnetic disk storage. Further, in some cases, the electronic device 100 may access external storage, such as RAID storage systems, storage arrays, network attached storage, storage area networks, cloud storage, or any other medium that can be used to store information and that can be accessed by the processor 702 directly or through another computing device or network. Accordingly, the computer-readable media 704 may be computer storage media able to store instructions, modules or components that may be executed by the processor 702.

The computer-readable media 704 may be used to store and maintain any number of functional components that are executable by the processor 702. In some implementations, these functional components comprise instructions or programs that are executable by the processor 702 and that, when executed, implement operational logic for performing the actions attributed above to the electronic device 100. Functional components of the electronic device 100 stored in the computer-readable media 704 may include the recognition module 202, the security module 204, the device state monitor 210, and the device care module 212, executable by the processor 702 for rewarding a user for providing sufficient care to an electronic device as discussed herein. Additional functional components stored in the computer-readable media 704 may include the recognition model 230 (not shown in FIG. 7), as described above, which may be part of the recognition module 202 or separate therefrom. Furthermore, while the recognition module 202, the security module 204, the device state monitor 210, and the device care module 212 are described separately herein for convenience of discussion, these may be combined as a single piece of executable code or incorporated into a single computer program.

Other functional components may include the operating system 106 and a user interface module 706 for controlling and managing various functions of the electronic device 100 and providing basic functionality. In some examples, the operating system 106 may manage and control at least a portion of the privacy restrictions described herein. The recognition module 102 and/or the security module 104 may be integrated into the operating system 106, or alternatively, may be separate therefrom. Additionally, the computer-readable media 704 may include one or more applications 208, such as one or more mobile applications or other types of applications that may be executed to utilize the electronic device 100 for perform various functions and uses.

In addition, the computer-readable media 704 may also store data, data structures and the like, that are used by the functional components. For example, data stored by the computer-readable media 704 may include the care information 254 that is used by the device care module 212. Further, the electronic device 100 may include many other logical, programmatic and physical components, of which those described are merely examples that are related to the discussion herein.

FIG. 7 further illustrates the display 102, which may be passive, emissive or any other form of display, and may have a touch sensor associated therewith. The electronic device 100 may further include the recognition devices, such as the camera 104, the microphone 106, the gyroscope 220, the accelerometer 218, the moisture sensor 222, as well as various types of other sensors 224, which may include a GPS device, altitude sensor, pressure sensor, and so forth. In addition, the electronic device 100 may include various other types of other input/output (I/O) components 708 such as various user controls (e.g., buttons, a joystick, a keyboard, a keypad, etc.), one or more speakers, a haptic or tactile output device, connection ports, and so forth. For example, the operating system 206 of the electronic device 100 may include suitable drivers configured to accept input from a keypad, keyboard, or other user controls and devices included as the I/O components 708. For instance, the user controls may include page turning buttons, navigational keys, a power on/off button, selection keys, and so on.

In some examples, the electronic device 100 may include at least one communication interface 256. The communication interface 256 may include one or more interfaces and hardware components for enabling communication with various other devices, such as other electronic devices 100 or other computing devices, such as directly or over a network. For example, the one or more communication interfaces 256 may support both wired and wireless connection to various networks, such as cellular networks, radio, Wi-Fi networks, short-range or near-field networks (e.g., Bluetooth®), infrared signals, local area networks, wide area networks, the Internet, and so forth. Additionally, the electronic device 100 may include a power source, such as a battery and power control unit 710 for providing power to electronic device 100. Furthermore, the electronic device 100 may include various other components that are not shown, examples of which include removable storage, a PC card component, and so forth, depending on the configuration and purpose of the electronic device 100.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Figure 8:
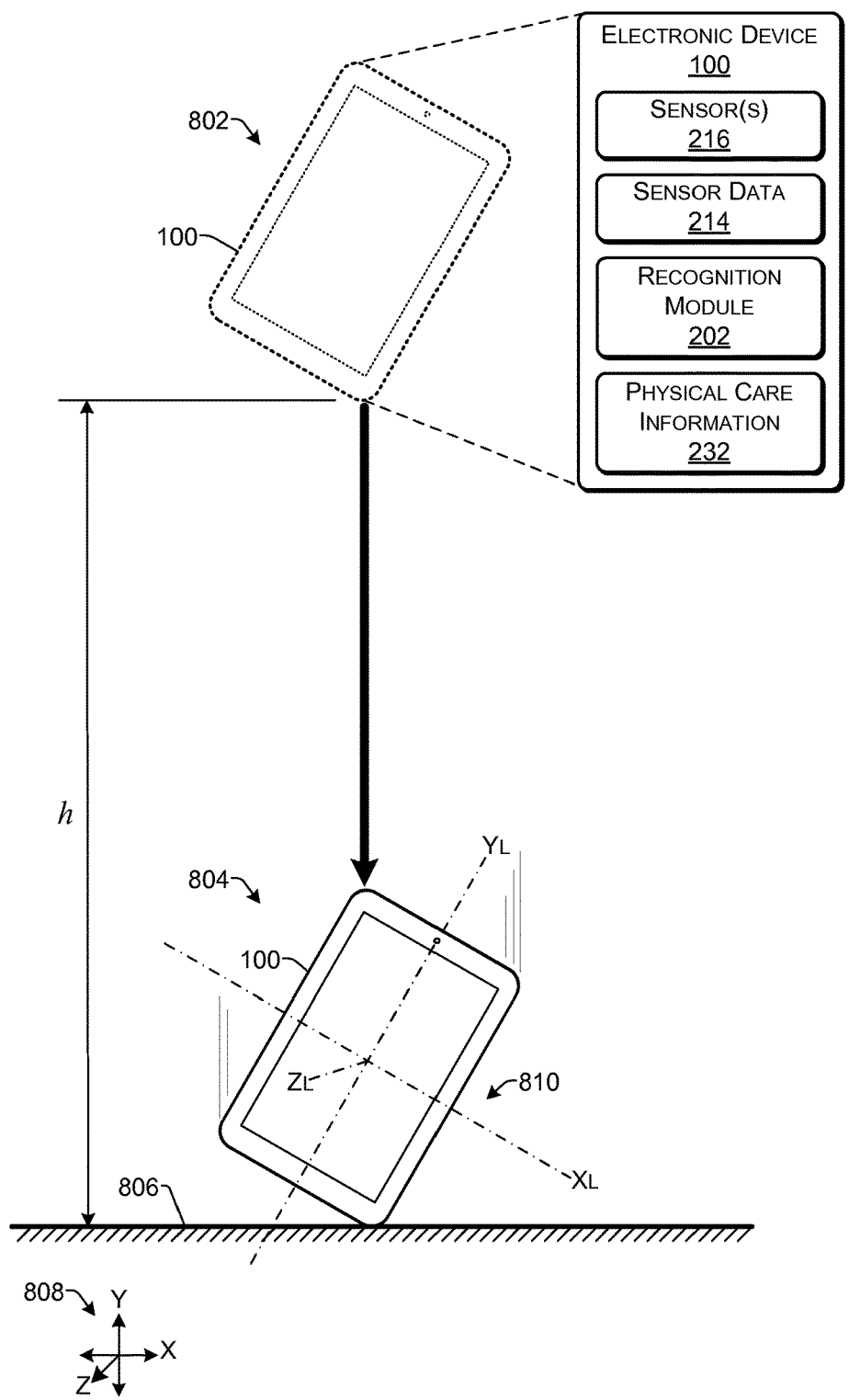
FIG. 8 illustrates an example portable electronic device able to determine a fall event according to some implementations.

FIG. 8 depicts an example electronic device 100 able to monitor and characterize a fall event according to some implementations. In the example of FIG. 8, the device 100 may be dropped, may be thrown, or otherwise may fall a height h from a first position 802 to a second position 804. In some cases, the electronic device 100 may contact or impact a surface 806 at the second position 804, such as a surface of a floor, a surface of the ground, or a surface of an object, such as a thing, a person, or any other object. Further, in some examples, the impact with the surface 806 may be a glancing or oblique contact, rather than at a normal angle to the surface 806. As discussed above, the electronic device 100 may include the sensors 216, such as one or more accelerometers, one or more gyroscopes, and/or various other sensors and components that may provide sensor data 214 to the recognition module 202 on the electronic device 100. For example, the sensor data 214 may indicate an orientation of the electronic device 100 and/or whether the electronic device 100 is in motion or undergoing acceleration. When a fall event occurs, the recognition module 202 may use the sensor data 214 obtained from the sensors 216 to store or generate physical care information 232. For example, the physical care information 232 may indicate the height h of the fall event and an attitude or orientation of the electronic device 100 before, during and/or after the fall event.

As one example, based on the sensor data 214, the recognition module 202 may detect a current orientation of the electronic device 100 and or acceleration of the electronic device 100 with respect to a coordinate system 808. In this example, the coordinate system 808 may be a global coordinate system in which a y-axis Y corresponds to gravity of the Earth, and an x-axis X and a z-axis Z are perpendicular to the y-axis Y and each other. The electronic device 100 may have a device local coordinate system 810 that includes a local y-axis YL, a local x-axis XL and a local z-axis ZL. Thus, based on the sensor data 214 from the sensors 216, the recognition module 202 may determine the attitude or orientation of the device's local coordinate system 810 relative to the global coordinate system 808. Furthermore, while example coordinate systems are described herein for convenience of discussion, in other examples, any suitable frame of reference may be employed for determining an orientation of the electronic device 100.

In some examples, the electronic device 100 may use any combination of the inputs from the multiple different sensors 216 for detecting that the electronic device 100 is in a type of motion or other condition that characterizes a fall. For instance, certain acceleration characteristics detected by an accelerometer and or rotational characteristics detected by gyroscope may indicate freefall or projectile motion conditions. Further, the electronic device 100 may allow some sensors, such as the accelerometer and/or gyroscope, to operate in the background at a low sampling rate until some type of movement indicative of a fall event is detected by the sensors operating in the background. When the sensors provide sensor data that is indicative of a possible fall event, the recognition module 202 may increase the sampling rate of the sensors 216 to collect a larger amount of data regarding the possible fall event. Thus, the recognition module 202 may capture and store the sensor data 214 for the fall event as a portion of the physical care information 232. Furthermore, should the electronic device 100 survive the fall functionally intact, the recognition module 202 may calculate the height h of the fall, a coefficient of restitution resulting from the fall, an orientation of the electronic device 100 during the fall and on impact with the surface 806, and various other types of physical care information 232 related to the fall event.

Figure 9:
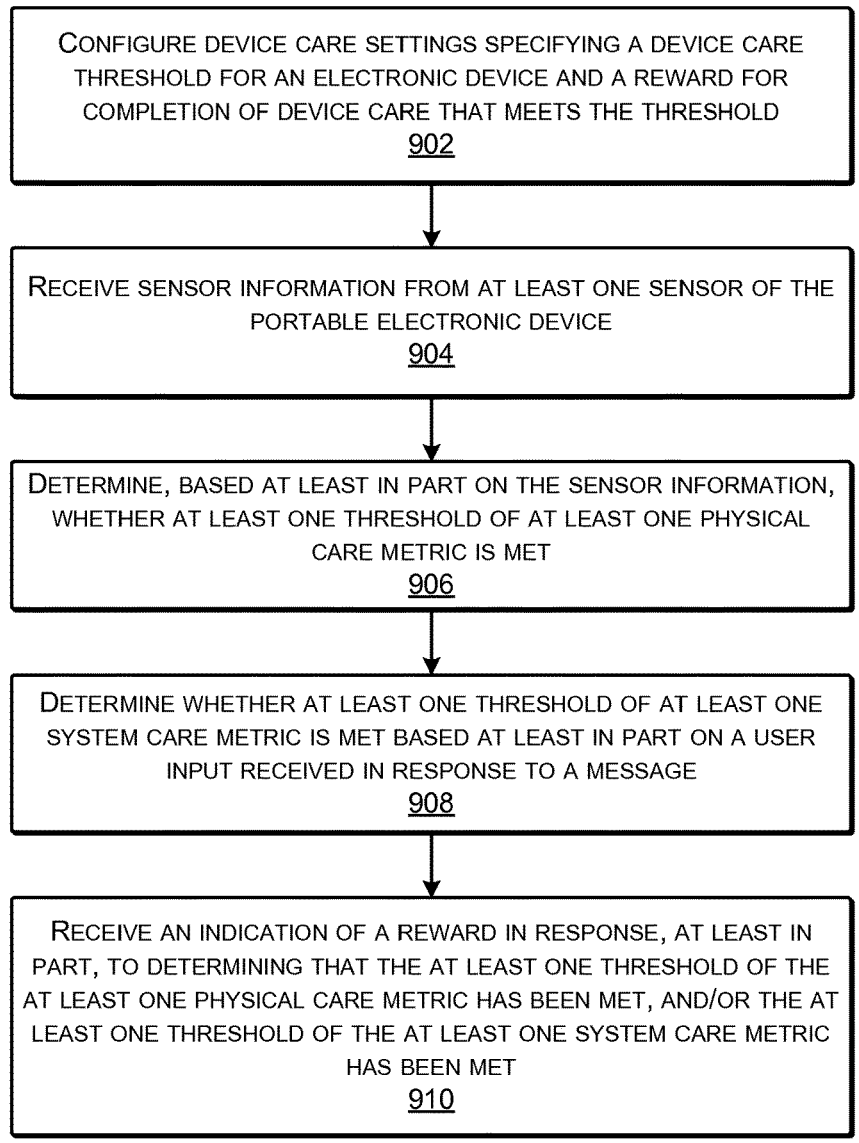
FIG. 9 is an example flow diagram of a process for providing one or more rewards to encourage care for an electronic device according to some implementations.
Figure 10:
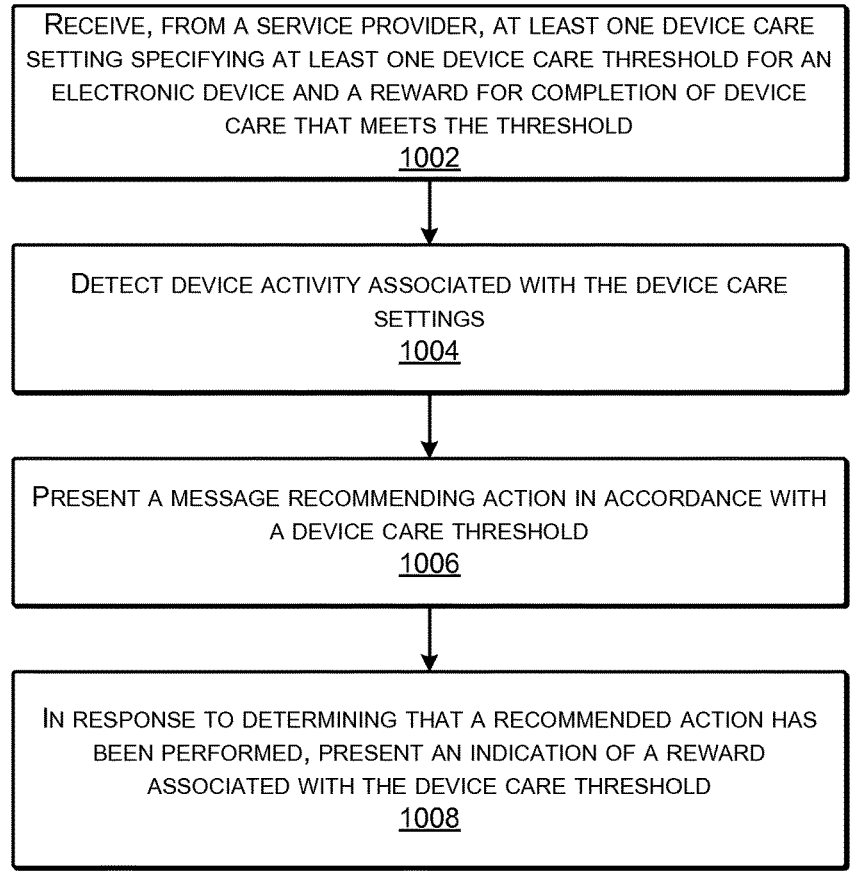
FIG. 10 is an example flow diagram of a process for providing one or more rewards to encourage care for an electronic device according to some implementations.
Figure 11:
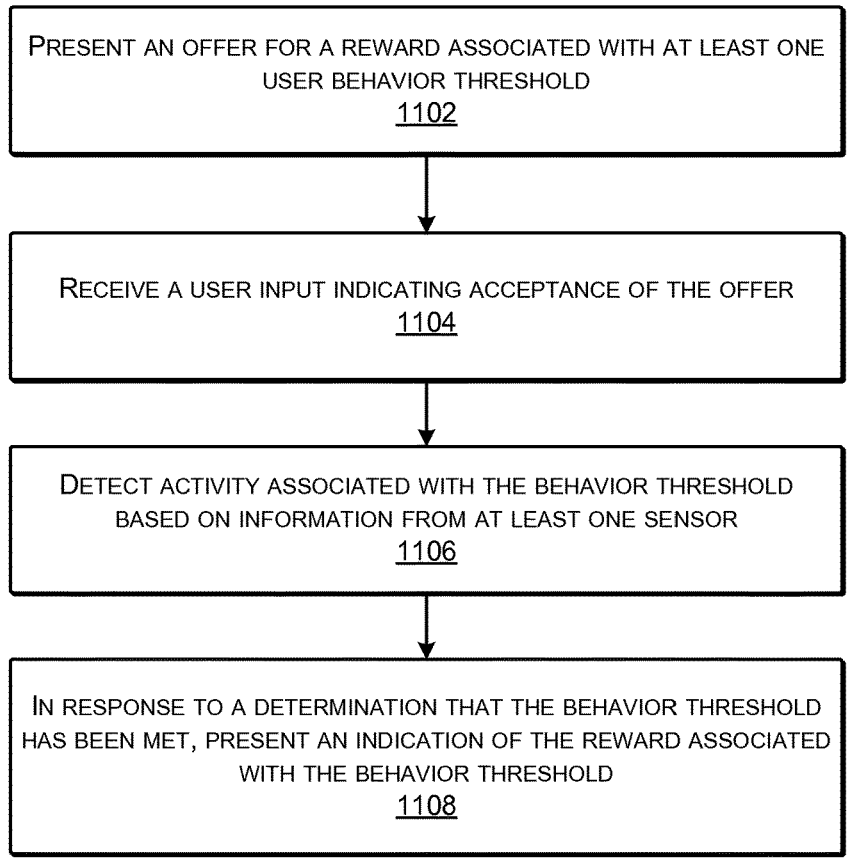
FIG. 11 is an example flow diagram of a process for providing one or more rewards to encourage beneficial behavior according to some implementations.

FIGS. 9-11 are flow diagrams of example processes that may be executed according to some implementations herein. FIGS. 9-11 are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the frameworks, devices and systems described in the examples herein, although the processes may be implemented in a wide variety of other frameworks, devices and systems.

FIG. 9 is a flow diagram of a process 900 for rewarding a user for physical care of an electronic device according to some implementations. In some examples, the process 900 may be executed, at least in part, by the electronic device 100 discussed above.

At 902, the electronic device may configure device care settings specifying one or more device care thresholds for the electronic device. The device care settings may further indicate one or more rewards that will be as awarded for device care that is sufficient to meet the one or more device care thresholds. For example, a parent may configure the device care settings to periodically provide a child with rewards having a monetary value if the child does not throw or drop the electronic device.

At 904, the electronic device may receive sensor information from one or more sensors of the electronic device. For example, an accelerometer may generate acceleration data during use of the electronic device and send the acceleration to a recognition module that may determine a fall event. The sensor information may further include information from a gyroscope, a moisture sensor or other sensors, as discussed above.

At 906, the electronic device may determine, based at least in part on the sensor information, whether at least one threshold of at least one physical care metric is met. For example, the electronic device may determine that the at least one threshold of the at least one physical care metric is met for fall events based at least in part on an absence of sensor information indicating the electronic device has been subjected to acceleration greater than a threshold amount over a specified period of time. For example, the electronic device may determine that certain acceleration characteristics detected by an accelerometer indicate that a freefall occurred while the user utilized the electronic device. Additionally, or alternatively, the electronic device may determine that the at least one threshold of the at least one physical care metric is met for moisture events based at least in part on an absence of sensor information indicating the electronic device has been subjected to excessive moisture over a specified period of time.

At 908, the electronic device may determine whether at least one threshold of at least one system care metric is met based at least in part on a user input received in response to a message. For instance, the message may relate to at least one of: an integrity value of an application or operating system installed on the electronic device; an update available for the application or operating system; usage data associated with at least one hardware component of the electronic device; device activity identified as malicious; or a security policy. Accordingly, the electronic device may determine that the at least one threshold of the at least one system care metric is met based on at least one of installation of malware to the electronic device was declined; or an application determined to include malware was uninstalled from the electronic device.

At 910, the electronic device may receive an indication of a reward in response, at least in part, to determining that the at least one threshold of the at least one physical care metric has been met, and the at least one threshold of the at least one system care metric has been met. For example, the device and/or the user account may receive an indication that one or more rewards have been awarded to the user, such as for not throwing or dropping the electronic device.

FIG. 10 is a flow diagram of a process 1000 for rewarding a user for sufficient care of an electronic device according to some implementations. In some examples, the process 1000 may be executed, at least in part, by one or more modules of the electronic device discussed above.

At 1002, the electronic device may receive, from a service provider computer, device care settings specifying device care thresholds for the electronic device, and one or more rewards that may be received for completion of device care sufficient to meet the one or more thresholds. For instance, an electronic device owner may purchase a warranty from a service provider for the electronic device. In accordance with the warranty agreement, the owner may receive rewards for taking care of the electronic device during the life of the warranty. Further, the service provider may provide device care settings to the electronic device, which specify that the owner would receive a coupon for future device purchases if the owner does not install malware on the electronic device, jailbreak the operating system, or the like.

At 1004, the electronic device may detect a device activity associated with the device care settings. For example, the electronic device may detect that the device user is attempting to install an application to the electronic device that has been blacklisted as malware.

At 1006, the electronic device may present a message recommending action in accordance with a device care threshold. For example, the recommended action may be related to the device activity and the device care settings. For example, the electronic device may provide a UI element on the display notifying the device user that the application is malware, and may recommend that the owner terminate the installation of the application. For instance, detecting activity on the electronic device may include detecting malicious activity, and the recommended action may remediate the malicious activity. As another example, detecting activity on the electronic device may include detecting that a battery of the electronic device is below a specified charge level, wherein the recommended action includes charging the battery prior to elapse of a period of time.

At 1008, in response to determining that the recommended action was performed, the electronic device may present an indication of a reward on a display of the device. For example, the electronic device may provide the user with a coupon for a device purchase, if the device owner does not install any malware during the life of the warranty.

FIG. 11 is a flow diagram of a process 1100 for rewarding a user for beneficial behavior that may be detected by an electronic device according to some implementations. In some examples, the process 1100 may be executed, at least in part, by the electronic device 100.

At 1102, the electronic device may present an offer for a reward associated with at least one user behavior threshold. For example, the electronic device 100 may present an offer for the user to receive a reward in response to detection of good driving behavior. The electronic device 100 may use the onboard accelerometer, an onboard GPS device, the communication interfaces, and other sensors to determine, e.g., the user's driving habits, and may inform the user that the user may be eligible to receive a reward, such as lower automobile insurance rates, if the user allows the electronic device to begin sharing the sensor information from the electronic device with the user's automobile insurance company. As another example, the electronic device 100 may determine, based at least in part on location information, that the user goes to a health club four days per week on a regular basis. The electronic device 100 may present an offer to the user to begin providing this information to the user's health insurance company to make the user eligible for a discount on health insurance. As another example, the electronic device 100 may be a wearable device that includes fitness monitoring capability, such as a heart-rate sensor, and may present an offer to begin providing information regarding workout frequency to the user's health insurance company to make the user eligible for a discount on health insurance. As another example, the user may be a child, and a reward may be offered to the child if the electronic device detects that the child is attending school classes on time. In some cases, the offer herein may be received from the service provider discussed above, and presented on the electronic device 100 by the device care module 212 or other suitable module.

At 1104, the electronic device may receive a user input indicating acceptance of the offer. For example, in response to presentation of the offer, the user may select a virtual control, such as a user interface button, to begin having the user's behavior monitored with respect to the specified user behavior threshold. Further, the user can choose not to opt in to the monitoring if the user decides not to participate.

At 1106, in response to the user indicating acceptance of the offer, the electronic device may detect activity associated with the behavior threshold based on information from at least one sensor. For instance, the electronic device may receive information from the accelerometer, GPS device, the communication interfaces, and other onboard sensors, such as for determining a location of the electronic device, a speed with which the electronic device is traveling, and/or other user activity relevant to the behavior threshold. The electronic device may determine whether the user is conforming to the user behavior threshold based at least in part on the sensor information. In some examples, the sensor information may be provided to the remote computing device 602 of the service provider via the one or more networks 604, and a module, such as the care information module 614 of the service provider may make a determination of whether the user is meeting the behavior threshold.

At 1108, in response to a determination that the behavior threshold has been met, the electronic device may present an indication of the reward associated with the behavior threshold. For example, in response to determining that the user has visited the health club four days per week for a month, the electronic device 100 may present a confirmation from the user's health insurance company that the user has qualified for a discount on health insurance for that month. Similarly, in response to determining that a child has attended class on time for a specified period of time, e.g., a week, a month, a semester, etc., the child may be presented with an indication of a reward, e.g., as discussed elsewhere herein. Numerous other variations will be apparent to those of skill in the art having the benefit of the disclosure herein.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:
    configuring an electronic device with at least one of:
        a first device setting specifying a first device threshold for the electronic device, the first device threshold comprising a threshold amount of acceleration; or
        a second device setting specifying a second device threshold for the electronic device, the second device threshold comprising a threshold amount of moisture;
    receiving, by one or more processors of the electronic device, first sensor information from at least one of an accelerometer, a gyroscope, or a moisture sensor of the electronic device;
    determining, based on the first sensor information, an occurrence of a physical event involving the electronic device, the physical event comprising at least one of a fall event or a moisture event;
    at least in part in response to determining the occurrence of the physical event, causing a sampling rate of the at least one of the accelerometer, the gyroscope, or the moisture sensor to increase from a first sampling rate to a second sampling rate;
    receiving, from the at least one of the accelerometer, the gyroscope, or the moisture sensor, second sensor information collected at the second sampling rate;
    determining, based on the second sensor information, a physical threshold for a physical metric is met over a period of time based on at least one of:
        an absence of sensor information indicating the electronic device has been subjected to acceleration greater than the threshold amount of acceleration over the period of time; or
        an absence of sensor information indicating the electronic device has been subjected to moisture greater than the threshold amount of moisture over the period of time;
    determining a system threshold for a system metric is met over the period of time based on determining: that the electronic device is free of malware or harmful effects of malware; and
    receiving an indication of a reward in response to determining that the physical threshold has been met and the system threshold has been met.

2. The method as recited in claim 1, further comprising:
    sending device information to a remote computing device associated with a service provider, the device information including information indicating that the physical threshold is met, and the system threshold is met;
    receiving from the remote computing device, in response at least in part to the sending, the indication of the reward; and
    storing at least the indication of the reward on the electronic device, wherein the reward is at least one of a graphical badge, monetary value, coupon, digital content item, hardware upgrade offer, purchase offer for the electronic device, or application related credit.

3. The method as recited in claim 1, further comprising:
    determining the system threshold is met based on a user input received in response to a message relating to:
    an integrity value of an application or operating system installed on the electronic device;
    an update available for the application or operating system;
    usage data associated with at least one hardware component of the electronic device;
    usage data associated with at least one application installed on the electronic device;
    device activity identified as malicious; or
    a policy on the device that indicates types of content permitted to be accessed.

4. An electronic device comprising:
    a display;
    one or more sensors;
    one or more processors able to receive sensor information from the one or more sensors;
    one or more computer-readable media; and processor-executable instructions maintained on the one or more computer-readable media which, when executed by the one or more processors, program the one or more processors to:
  receive the sensor information from the one or more sensors, the sensor information representing an amount of at least one of: acceleration or moisture;
  determine that a portion of the sensor information indicates an occurrence of a physical event involving the electronic device, the physical event comprising at least one of a fall event or a moisture event;
  in response to determining that the first portion of the sensor information indicates the occurrence of the physical event, cause a sampling rate of the one or more sensors to increase from a first sampling rate to a second sampling rate;
  receive, from the one or more sensors, additional sensor information collected at the second sampling rate;
  determine device information, based at least in part on the additional sensor information, indicating that the amount has not exceeded at least one of an acceleration threshold or a moisture threshold for a period of time;
  sending, to a remote computing device, the device information; and
  presenting, on the display, an indication of a reward.

5. The electronic device as recited in claim 4, wherein the one or more processors are further programmed to determine that the amount has not exceeded the acceleration threshold based at least in part on an absence, over the period of time, of the additional sensor information that indicates a fall height greater than a specified height.

6. The electronic device as recited in claim 4, wherein the one or more processors are further programmed to determine that the amount has not exceeded the acceleration threshold, based at least in part on an absence, over the period of time, of the additional sensor information that indicates projectile motion greater than a specified quantity.

7. The electronic device as recited in claim 4, wherein the one or more processors are further programmed to determine that the amount has not exceeded the moisture threshold, based at least in part on an absence, over the period of time, of the additional sensor information that indicates exposure of the electronic device to more than a threshold level of moisture.

8. The electronic device as recited in claim 4, wherein the one or more processors are further programmed to send the indication of the reward to the remote computing device for association of the reward with an account associated with the electronic device.

9. The electronic device as recited in claim 4, wherein the one or more processors are further programmed to determine that at least one threshold corresponding to at least one system metric is met based on at least one of:
  an absence of device activity identified as malicious; or
  an absence of device applications identified as malicious.

10. The electronic device as recited in claim 4, wherein the one or more processors are further programmed to determine that at least one threshold of at least one system metric is met based on at least one of:
  user input in response to an integrity value of an application or operating system installed on the electronic device;
  user input to update at least one of an operating system or an application;
  usage data associated with at least one hardware component of the electronic device;
  usage data associated with at least one application installed on the electronic device;
  user input in response to device activity identified as malicious; or
  user input in response to a policy on the device that indicates types of content permitted to be accessed.

11. The electronic device as recited in claim 4, wherein the one or more processors are further programmed to receive, from the remote computing device, at least one of a trade-in value or resale value of the electronic device based at least in part on the device information.

12. A method comprising:
  configuring an electronic device with a device setting specifying at least one of: an acceleration threshold or a moisture threshold;
  receiving first sensor information from one or more sensors of the electronic device, the first sensor information representing an amount of at least one of: acceleration or moisture;
  determining, based on the first sensor information, an occurrence of a physical event involving the electronic device, the physical event comprising at least one of a fall event or a moisture event;
  at least in part in response to determining the occurrence of the physical event, causing a sampling rate of the one or more sensors to increase from a first sampling rate to a second sampling rate;
  receiving, from the one or more sensors, second sensor information collected at the second sampling rate, the second sensor information representing the amount;
  determining device information, based on at least a portion of the second sensor information, the device information indicating that the amount has not exceeded at least one of the acceleration threshold or the moisture threshold for a period of time;
  determining based at least in part on additional sensor information, that an additional threshold of an additional device metric has been met over a period of time;
  sending, to a remote computing device, the device information and information indicating that the additional threshold has been met over the period of time; and
  presenting, on a display associated with the electronic device, an indication of a reward.

13. The method as recited in claim 12, further comprising determining that the additional threshold is met, based at least in part on an absence, over the period of time, of the at least one of the first sensor information or the second sensor information that indicates a fall height greater than a specified height.

14. The method as recited in claim 12, further comprising determining that the additional threshold is met, based at least in part on an absence, over the period of time, of at least one of the first sensor information or the second sensor information that indicates projectile motion greater than a specified quantity.

15. The method as recited in claim 12, further comprising determining that the additional threshold is met, based at least in part on an absence, over the period of time, of at least one of the first sensor information or the second sensor information that indicates exposure of the electronic device to more than a threshold level of moisture.

16. The method as recited in claim 12, further comprising sending the indication of the reward to a remote computing device for association of the reward with an account associated with the electronic device.

17. The method as recited in claim 12, further comprising determining that at least one threshold of at least one system metric is met based on at least one of:
- an absence of device activity identified as malicious; or
- an absence of device applications identified as malicious.

18. The method as recited in claim 12, further comprising determining that at least one threshold of at least one system metric is met based on at least one of:
- user input in response to an integrity value of an application or operating system installed on the electronic device;
- user input to update at least one of an operating system or an application;
- usage data associated with at least one hardware component of the electronic device;
- usage data associated with at least one application installed on the electronic device;
- user input in response to device activity identified as malicious; or
- user input in response to a policy on the device that indicates types of content permitted to be accessed.

19. The method as recited in claim 12, further comprising receiving, from the remote computing device, at least one of a trade-in value or resale value of the electronic device based at least in part on the device information.

20. The method as recited in claim 12, further comprising presenting, on the display associated with the electronic device, at least one graphic element indicating a current status of the amount of the at least one of the acceleration or the moisture and the additional device metric and an indication of progress toward a next reward.

* * * * *